(12) United States Patent
Linder et al.

(10) Patent No.: US 8,455,557 B2
(45) Date of Patent: Jun. 4, 2013

(54) MEMBRANES, COATINGS AND FILMS AND METHODS FOR THEIR PREPARATION

(75) Inventors: Charles Linder, Rehovot (IL); Ora Kedem, Haifa (IL); Yoram Oren, Beer Sheva (IL)

(73) Assignee: Ben Gurion University of the Negev R&D Authority, Beer Sheva (IL)

( * ) Notice: Subject to any disclaimer, the term of this patent is extended or adjusted under 35 U.S.C. 154(b) by 832 days.

(21) Appl. No.: 12/227,634

(22) PCT Filed: May 24, 2007

(86) PCT No.: PCT/IL2007/000634
§ 371 (c)(1),
(2), (4) Date: Sep. 21, 2009

(87) PCT Pub. No.: WO2007/135689
PCT Pub. Date: Nov. 29, 2007

(65) Prior Publication Data
US 2012/0178834 A1    Jul. 12, 2012

Related U.S. Application Data

(60) Provisional application No. 60/802,784, filed on May 24, 2006, provisional application No. 60/802,778, filed on May 24, 2006.

(51) Int. Cl.
*B01J 49/00* (2006.01)
*C08F 8/30* (2006.01)

(52) U.S. Cl.
USPC ....... 521/27; 525/351; 525/326.2; 525/326.4; 525/359.1

(58) Field of Classification Search
USPC ............ 521/27; 525/351, 326.2, 326.4, 359.1
See application file for complete search history.

(56) References Cited

U.S. PATENT DOCUMENTS

| | | |
|---|---|---|
| 3,402,144 A | 9/1968 | Hay |
| 3,516,791 A | 6/1970 | Evans |
| 3,556,305 A | 1/1971 | Shorr |
| 3,567,810 A | 3/1971 | Baker |
| 3,615,024 A | 10/1971 | Michaels |
| 3,639,337 A | 2/1972 | Klebe |
| 3,812,224 A | 5/1974 | Smith |
| 3,840,646 A | 10/1974 | Sugimoto |
| 3,989,981 A | 11/1976 | Ogle |
| 4,029,582 A | 6/1977 | Ishii |
| 4,188,354 A | 2/1980 | Bottino |
| 4,247,498 A | 1/1981 | Castro |
| 4,256,596 A | 3/1981 | Cohen |
| 4,273,903 A | 6/1981 | Rose |
| 4,413,106 A | 11/1983 | Coplan |
| 4,466,931 A | 8/1984 | Tanny |
| 4,504,852 A | 3/1985 | Ducret |
| 4,508,832 A | 4/1985 | Carter |
| 4,508,852 A | 4/1985 | Bikson |
| 4,598,137 A | 7/1986 | Guiver |
| 4,657,990 A | 4/1987 | Daoust |
| 4,690,765 A | 9/1987 | Linder |
| 4,781,733 A * | 11/1988 | Babcock et al. ................. 95/49 |
| 4,797,187 A | 1/1989 | Davis |
| 4,797,457 A | 1/1989 | Guiver |
| 4,839,203 A | 6/1989 | Davis |
| 4,889,636 A * | 12/1989 | Perry et al. .................... 210/651 |
| 4,894,159 A | 1/1990 | Guiver |
| 4,990,252 A | 2/1991 | Tomaschke |
| 5,013,765 A | 5/1991 | Sluma |
| 5,028,337 A | 7/1991 | Linder |
| 5,032,282 A | 7/1991 | Linder |
| 5,039,421 A | 8/1991 | Linder |
| 5,068,070 A | 11/1991 | Gunji |
| 5,071,448 A | 12/1991 | Bikson |
| 5,128,378 A | 7/1992 | Sugaya |
| 5,173,542 A * | 12/1992 | Lau et al. ...................... 525/351 |
| 5,227,457 A | 7/1993 | Marrocco, III |
| 5,348,569 A | 9/1994 | Bikson |
| 5,364,454 A | 11/1994 | Bikson |
| 5,438,082 A | 8/1995 | Helmer-Metzmann |
| 5,625,010 A | 4/1997 | Gagne |
| 5,670,564 A | 9/1997 | Gagne |
| 5,766,528 A | 6/1998 | Su |

(Continued)

FOREIGN PATENT DOCUMENTS

| | | |
|---|---|---|
| DE | 102004063215 | 2/2007 |
| EP | 0152161 | 8/1985 |

(Continued)

OTHER PUBLICATIONS

Alberti, G. and Casciola, M., "Layered metalIV phosphonates, a large class of inorgano-organic proton conductors", Solid State Ionics, 97(1-4):177-186 (1997).

(Continued)

*Primary Examiner* — Michael M Bernshteyn
(74) *Attorney, Agent, or Firm* — Rodney J. Fuller; Booth Udall Fuller, PLC

(57) ABSTRACT

There are provided herein selective membranes, such as composite membranes, and/or films and processes for their preparation. The membranes and/or films have a given morphology which may be stabilized, for example against swelling and chemical degradation, by covalent crosslinking and optionally, in addition, by hydrophobization. There is provided a membrane and/or film and a process for the preparation thereof, the membrane and/or film include an ionomer and/or polyelectrolyte crosslinked through aryl-aryl (—Ar—Ar—), aryl-ether-aryl (—Ar—O—Ar—) and/or aryl-sulfide-aryl (—Ar—S—Ar—) bonds.

22 Claims, No Drawings

U.S. PATENT DOCUMENTS

| | | | |
|---|---|---|---|
| 5,886,130 | A | 3/1999 | Trimmer |
| 5,922,203 | A | 7/1999 | Tomaschke |
| 6,090,895 | A | 7/2000 | Mao |
| 6,103,414 | A | 8/2000 | Cabasso |
| 6,509,441 | B1 | 1/2003 | Kerres |
| 6,632,847 | B1 | 10/2003 | Soczka-Guth |
| 2002/0045085 | A1 | 4/2002 | Formato |
| 2004/0242807 | A1 | 12/2004 | Weber |
| 2005/0031925 | A1* | 2/2005 | Ofer et al. ............ 429/30 |
| 2005/0031928 | A1 | 2/2005 | Ishizone |
| 2005/0238937 | A1* | 10/2005 | Oren et al. ............ 429/33 |
| 2005/0261459 | A1 | 11/2005 | Marrocco, III |
| 2006/0008697 | A1* | 1/2006 | Kim et al. ............ 429/42 |
| 2006/0036064 | A1 | 2/2006 | McGrath |
| 2006/0047095 | A1 | 3/2006 | Pacetti |
| 2007/0163951 | A1 | 7/2007 | McGrath |

FOREIGN PATENT DOCUMENTS

| | | |
|---|---|---|
| EP | 0489693 | 6/1992 |
| GB | 2000720 | 1/1979 |
| IL | 120635 | 8/1997 |
| JP | 2000072965 | 3/2000 |
| JP | 2000309707 | 11/2000 |
| WO | 99/40996 | 8/1999 |
| WO | 2010/095139 | 8/2010 |

OTHER PUBLICATIONS

Bierenbaum, Harvey S. et al., "Microporous Polymeric Films", Ind. Eng. Chem. Prod. Res. Dev., 13(1):2-9 (1974).

Daly, William H. et al., "Modification of Condensation Polymers Challenges and Opportunities", ACS Symposium Series 364 chapter 1:4-23 (1988).

Fritsch, Detlev et al., "Syntheses of branched poly(ether Ketones)s with pendant functional groups based on 1,1,1-tris(4-hydroxyphenyl)ethane", J of Macromolecular science A, 39(11):1335-1347 (2002).

Kim, Young H. and Webster, Owen W., "Hyperbranched Polyphenylenes", Macromolecules 25(21):5561-5572 (1992).

Kopitzke, R. W., "Sulfonation of a poly(phenylquinoxaline) film", Journal of Polymer Science Part A: Polymer Chemistry, 36(7):1197-1199 (1998).

Kovacic, Peter & Jones, Martin B., "Dehydro coupling of aromatic nuclei by catalyst-oxidant systems: poly(p-phenylene)", Chem. Rev., 87(2):357-379 (1987).

Kricheldorf, Hans R. et al., "Synthesis and functionalization of polyethersulfones based on 1,1,1 tris (4-hydroxyphenyl) ethane", J polymer Science A: Polymer Chemistry 40(17):2967-2978 (2002).

Lee, Angela Lisandra S. et al., "Novel glycerol cross-linked poly(acrylic acid) hydrogel for encapsulation and release of benzocaine", Philippino Science Letters 4(2):81-87 (2011).

Linder, Charles and Kedem, Ora, "Asymmetric ion exchange mosaic membranes with unique selectivity", Journal of Membrane Science, 181(1):39-56 (2001).

Litter, Marta I. and Marvel, C. S., "Polyaromatic ether-ketones and polyaromatic ether-ketone sulfonamides from 4-phenoxybenzoyl chloride and from 4,4'-dichloroformyldiphenyl ether", Journal of Polymer Science: Polymer Chemistry Edition, 23(8):2205-2223 (1985).

Saito, Kei et al., "Oxidative polymerization of 2,6 dimethylphenol to form Poly(2,6 dimethyl-1,4-phenylene oxide) in Water", Angew Chem Int Ed Engl, 43(6):730-733 (2004).

Uchimoto, Yoshiharu et al., "Ionically conductive thin polymer films prepared by plasma polymerization. Part 7. Preparation and characterization of solid polymer electrolyte having fixed carboxylic acid groups with single mobile species", Solid State Ionics, 40-41(2):624-627 (1990).

Xu, Jing-Kun et al., "Doping level increase of poly(3-methylthiophene) film during electrochemical polymerization process", Chinese Journal of Polymer Science, 20(5):425-430 (2002).

Yang, Yunsong et al., "Synthesis of poly[arylene ether sulfone-b-vinylidene fluoride] block copolymers", European Polymer Journal, 2004 40(3):531-541 (2004).

Yang, Yunsong et al., "Synthesis of Sulfonated Polysulfone-block-PVDF Copolymers: Enhancement of Proton Conductivity in Low Ion Exchange Capacity Membranes", Macromolecules, 37(5) 1678-1681 (2004).

ISR of PCT/IL2007/000634 mailed Oct. 1, 2009.

ISR of PCT/IL2010/000148 mailed May 21, 2010.

EP 07736374.5 Supplementary European Search Report Mar. 18, 2011.

* cited by examiner

MEMBRANES, COATINGS AND FILMS AND METHODS FOR THEIR PREPARATION

The present application is a U.S. National Phase of PCT Application No. PCT/IL2007/000634, filed on May 24, 2007, which claims the benefit under 35 U.S.C. 119(e) of U.S. Provisional Application 60/802,778 filed May 24, 2006 and U.S. Provisional Application 60/802,784 filed May 24, 2006, the entire disclosure which is incorporated herein by reference.

FIELD OF THE DISCLOSURE

The present disclosure generally relates to the field of membranes. More specifically, the present disclosure relates to crosslinked selective barriers as composite and/or film membranes and methods for the preparation thereof.

BACKGROUND

Various membrane processes may generally be applied for water treatment or industrial treatment applications. The cost effectiveness of these processes may vary depending on the specific application(s), site considerations, such as energy availability, capital costs, competitive processes and the combination of the membrane properties (such as flux, separation characteristics, performance stability, and fouling resistance as well as the ability to be cleaned when fouled). For water treatment and desalination applications, for example, to-date commonly used membranes are reverse osmosis (RO) and/or nanofiltration membranes (NF) membranes based on polyamide composites. These membranes may generally be considered to have high flux and rejection characteristics, even though from the stability and chemical resistance point there is still a need for improvement. Other NF and RO membranes, such as polyvinyl alcohol and sulfonated engineering plastics membranes, may generally be considered to have better chemical resistance but suffer from flux/selectivity characteristics worse than the polyamide composites membranes. It appears however that for many water applications chemical stability as well as flux and rejection may be considerably important. Therefore the development and manufacture of membranes having the flux/selectivity/rejection properties similar to (or better than) that of the polyamide membranes but with a chemical stability similar to (or better than) the chemical stability of sulfonated polyether sulfones is highly important and may considerably lower the cost of water treatment.

In desalination of water streams, especially seawater and brackish water high rejections without loss of flux would decrease the coast of the final water product. Thus RO membranes with higher salt rejections are very important. There are also many applications in water purifications where one would like to also remove boron or nitrates. Existing RO and NF membranes still do not have the long-term rejections to these components and any membrane or modification that can improve the rejection of NF and RO membranes to these solutes is also important. Higher rejections for example for sea water desalination, or boron removal or nitrate removal to name a few applications.

Other important membrane related applications include electro-membrane processes (Electrodialysis, ED) and Donnan Dialysis (DD). ED and DD processes need to be improved with respect to selectivity in order to reduce the cost of the process.

Existing membranes, such as composite membranes and more specifically, thin film composite membranes, suffer from many disadvantages. For example, coating of a support layer with a discriminating layer may result in variations of thickness of coating material. In areas where no coating is present or where the coating is below a certain thickness the membrane may be exceedingly porous and therefore may not have sufficient separation capability. Where the coating exceeds the desired thickness, the flux may be affected. In membranes where the discriminating layer is prepared separately, the discriminating layer may at least partially separate from the support layer.

There are ionic polymers such as polyelectrolytes and ionomeric materials which offer good potential for making, for example, highly stable selective NF and RO membranes if they can be prepared in a given morphology and fixed into this morphology by crosslinking. A major problem in using such ionic polymers effectively has been the difficulty of first forming a given film or barrier with the required physicochemical and morphological structures, and then fixing these structures by crosslinking the structures into a given fixed morphology, and the formation of defect free films especially very thin films of less than a micron.

Among the existing membrane related technologies that are commonly applied are the following:

1) Thin film composite or coated membrane having a porous polymeric substrate with one or more microporous layers to which a thin film or coating comprising a sulfonated polyarylether is attached substantively to provide an oxidatively stable, thin hydrophilic film or coating layer. This may be suitable for reverse osmosis, ultrafiltration and microfiltration applications. The sulfonated polymer is applied by coating directly onto the porous support and gives RO membranes. In general the problem with thin selective layers especially for RO and NF based on ionomers and polyelectrolytes is the continuous swelling and change in performance over time and/or in changes in the ionic strength of the solution in systems, which are not crosslinked. Chemically stable crosslinking in chemically stable ionomeric materials is however difficult to achieve.

It is possible in cases like sulfonated polysulfone and polyether sulfone and other sulfonated engineering plastic composites to tailor the performance of composite RO membranes by optimizing the degree of sulfonation of the polyaryl ether thin film polymer to narrow ranges of ion exchange capacity (IEC). As high IEC values needed for high flux give relatively low rejections due to swelling this approach is still not sufficient to achieve high rejecting RO membranes with high flux. This optimum is still also not sufficient to give NF membranes with a combination of high flux and high rejection to organics.

RO membranes with high rejections and fluxes with an order of magnitude better chlorine or chlorine based oxidants or oxidant stability better than polyamide membranes have yet to be developed, particularly for improving the economy of water production NF membranes with a combination of stable high flux, high organic rejections, and chlorine resistance are still lacking.

2) Crosslinking of polymers is used in membrane technology to prepare selective layers of composite membranes and specialized porous supports for composite membranes, for UF and NF integrally skinned membranes made by phase inversion, as self standing films for ED and fuel cells as well as other energy conversion systems (for example, supercapacitors). For example, a method of crosslinking ion-conducting polymers through the sulfonic acid groups to form sulfone crosslinks between polymer chains is described. This method entails sulfonating the polymer (for example, polyetheretherketone (PEEK) using concentrated sulfuric acid, casting of a film, then heating the film which causes the crosslinking to occur. After the crosslinking about many of the sulfonic acid groups in the total solution had been converted to sulfone groups by the cross-linking process. Enough sulfonic groups remain however, for sufficient proton conductivity. This method is often not reproducible in general, works with only certain ionomers such as PEEK, and needs an extensive heating step of hours to days which is often not practical in making composites in general or more specifically of a thin layer composites on UF supports where some of the components may not have the necessary heat stability.

3) Crosslinking of derivatives of 2,6 dimethy phenylene oxide (PPO), especially bromomethylated and sulfonated has been studied. Blend membranes based on sulfonated PPO for polymer electrochemical cells, for example sulfonated PPO, in the hydrogen form readily undergoes crosslinking upon heating under acid conditions and this has been used to stabilize ion exchange membranes of sulfonated PPO in PVDF (polyvinylidene fluoride) mixtures for Fuel cell (FC) and energy conversion devices. These crosslinked membranes, however, do not have good free radical stability and make poor selective RO and NF membranes. The crosslinking step of heating the sulfonic acid form of the PPO results in a loss of sulfonic groups which may change the selectivity and flux properties in an unpredictable way since the SPPO is the main ionomer which confers the selectivity and flux properties in the membrane.

4) Other methods of crosslinking of ion conducting polymers for fuel cells based on sulfonic or phosphonic or carboxylated polymers also exist, for example, composite solid polymer electrolyte membranes (SPEMs) which include a porous polymer substrate interpenetrated with an ion-conducting material. The crosslinking methods described for this method are essentially the methods described above, which have the limitations already described and crosslinking methods, that involve amides and imides crosslinks, which lack oxidant and chemical stability.

5) Sulfinic acid and salts (Li, Na, K, Rb, Cs or other mono- or di-valent metal cations) chemistry has been recently used to produce crosslinked ion exchange membranes based on engineering plastics as well as other polymers. These applications are primarily discussed for ion exchange membranes for fuel cells but have also been proposed for use also in membrane processes in general, such as membrane separation operations, preferably in the context of gas separation, pervaporation, perstraction, reverse osmosis, nanofiltration, electrodialysis, and diffusion dialysis. Different ways discussed of forming crosslinked ion exchange polymers with sulfinc groups are discussed. The sulfuric groups can be reacted with haloalkylated crosslinkers to form alkyl aromatic sulfones crosslinks, or the alkyl groups can be reacted under conditions were the sulfinic groups can disproportinate with each other to form sulfinates (—S(S=O)2S—.

The above approaches of sulfonic polymers require relatively difficult synthesis which would increase the cost of FC and ED membranes. The use of aprotic solvents would make it difficult to produce composite RO and NF membranes by coating the solutions of the precursor polymers of the selective barriers in these solvents on most current UF supports as most supports are not stable to such solvents. Extensive heating under vacuum is also detrimental to facilitate membrane production procedures. The generation of a high concentration of sulfone crosslinks increases hydrophobicity to a great extend, which may limit flux that is important for NF and RO membranes. Even though in some approaches starting with a large number of sulfonic acid groups allow sacrifice of sulfonic acid groups for appropriate cross-linking this is difficult to control.

6) Diazonium crosslinking reactions are also known in preparing membranes by reactions of cationic groups (sulfonium, quaternary ammonium, phosphonium, pyridinium, thiazolinium, imidazolinium and diazonium) with nucleophilic groups. In these processes there is a use of polysulfone (a polyaromatic condensate an engineering plastic), which can be chloromethylated and converted to a water-compatible trimethylammonium hydroxide derivative by reaction with trimethyl amine followed by ion exchange. This product is reacted with p,p'-dimercaptodiphenyl to obtain a crosslinked product, wherein the bond is through the methyl group, which may cause stability related problems.

Diazonium salts were also used in the modification of polyamide membranes.

There is a need in the art for improved and cost effective membranes that may be applied, for example, in any of the fields disclosed herein.

GLOSSARY

The term "membrane" as referred to herein may relate to a selective barrier that allows specific entities (such as molecules and/or ions) to pass through, while retaining the passage of others. The ability of a membrane to differentiate among entities (based on, for example, their size and/or charge and/or other characteristics) may be referred to as "selectivity". More information regarding membranes may be found, for example, in http://wwvv.bccresearch.com/membrane/DMD00.html and http://www.geafiltration.com/glossary_filtration_terminologies.asp which are herein incorporated by reference in their entirety.

The term "composite membrane" as referred to herein may relate to membranes that include more than one material wherein the materials may have different densities. Composite membrane may include for example "thin film composite membranes" which may generally refer to membranes constructed in the form of a film from two or more layered materials. A particularly useful composite is a thin dense film on a thicker porous support.

The term "flux" as referred to herein may relate to a volume of treated liquid (such as water, fermentation liquors, concentration of antibiotics, waste and other liquids) obtained per unit time per unit membrane surface area.

The term "permeate" as referred to herein may relate to a product, for example liquid, which has passed through a membrane. The term "permeate" may, for example, relate to a non concentrated resultant products during filtration.

The term "retentate" (may also be referred to as "concentrate") as referred to herein may relate to a fraction not passing through the membrane.

The term "rejection" as referred to herein may generally relate to a percentage of a substance (such as a salt) rejected (not allowed to pass the membrane) in a membrane (such as a reverse osmosis membrane) process. The rejection may be calculated, for example, as the percentage of salt, which is held back by the membrane. For example, $R=1-(C_p/C_b)$ where R=Rejection, $C_p$=Concentration in Permeate, $C_b$=Concentration in Retentate.

The term "micro-filtration" or "MF" as referred to herein may relate to a technique that utilizes a low-pressure cross-flow membrane process for separating colloidal and suspended particles in the range of 0.05-10 microns. MF may be used foe example for fermentation broth clarification and biomass clarification and recovery.

The term "ultrafiltration" or "UF" as referred to herein may relate to a membrane separation technique used to separate small particles and dissolved molecules in fluids. The primary basis for separation may be molecular size, although other factors, such as but not limited to, molecule shape and charge can also play a role. Molecules larger than the membrane pores will generally be retained at the surface of the membrane and concentrated during the ultrafiltration process. The retention properties of ultrafiltration membranes may be expressed as "Molecular Weight Cutoff" (MWCO). This value may refer to the approximate molecular weight (MW) of a molecule, compound and/or material (such as polymers, proteins, colloids, polysaccharides, suspended solids and/or solutes), which is about 90% or more retained by the membrane. However, a molecule's shape can have a direct effect on its retention by a membrane. For example, linear molecules like DNA may find their way through pores that will retain a globular species of the same molecular weight.

Ultrafiltration membranes may be adapted to let through small molecules (such as water, low-molecular-weight organic solutes and salts) and retain high-molecular weight molecules (such as, polymers, proteins, colloids, polysaccharides, and/or suspended solids and solutes of molecular weight greater than 1,000). UF may be performed under pressures up to about 145 psi (10 bar). Ultrafiltration (UF) may also relate a technique that utilizes membranes, such as having micropores of about 1 to 100 nanometer (nm) in diameter.

Typically, separations of monovalent and divalent salts and organic solutes of molecular weights up to 1000 characterize membrane selectivity between the RO and UF regions. The range of membrane separation characteristics that are covered by this definition are currently known as NF. The term "nanofiltration" or "NF" as referred to herein may also be related to a technique that utilizes membranes that retain some low and medium molecular weight solutes and does not retain others. NF membranes may be adapted to essentially let through monovalent ions and organic compounds with low molecular weight (typically less than about 300 g/mol) and retain multivalent ions (for example, calcium, magnesium, aluminum, sulfates ions and others), non-ionized organic compounds (for example solutes) with high molecular weight (typically higher than about 300 g/mol) and suspended solids. Typically, NF membranes' selectivity is characterized by separations of monovalent and divalent salts and organic solutes of molecular weights up to 1000. Thus, for example, NF membranes may be available with molecular weight cut offs of, for example, 80, 50, 20 and 0% rejection to NaCl and 95+% for 1,000 MW dextran. Such membranes may be used, for example, in water softening, fractionation of pharmaceutical fermentation liquors, whey desalting with lactose retention, skim milk concentration, fractionation of sugars, concentration of antibiotics, treatment of surface water and drinking water, municipal waste treatment for agricultural use, and in numerous other industrial uses for treatment of process and waste streams.

The term "reverse osmosis" or "RO" as referred to herein may relate to a technique that utilizes dense membranes that allow solvents, typically water, to pass through while retaining any salts. RO may be used, for example, to demineralize water (such as seawater or brine desalting) or for the production of ultrapure water. RO may be performed under high pressures.

The term open RO and tight NF often mean the same membranes and the demarcation between the two is not clear. Similarly the demarcation between tight UF and open UF is often not clear and the terms may be used interchangeably.

The term "fuel cell" as referred to herein may relate to an electrochemical energy conversion device that produces electricity from external supplies of fuel (such as hydrogen, hydrocarbon, including for example, diesel and methanol) on the anode side and oxidant (on the cathode side). Polymer electrolyte membrane fuel cells (PEFC or PEMFC, may also be called proton exchange membrane fuel cells, same short writing, PEMFC) utilize a proton-conducting polymer membrane, (the electrolyte), that separates the anode and cathode sides.

An "Ion exchange membrane" (for example, proton exchange membrane, PEM) may refer to a semipermeable membrane generally made from ionomers and designed to conduct ions, such as protons while being impermeable to gasses such as oxygen or hydrogen. This is their essential function when incorporated into an ion exchange membrane fuel cell, separation of reactants and transport of ions such as protons. Ion exchange membranes can be made from either pure polymer membranes or from composite membranes where other materials (for example, metal salts, inorganics, ceramics, solid acids, bases, and others) are embedded in a polymer matrix (such as polyaromatic polymers or partially fluorinated polymers such as Nafion). In operation, on the anode side, gas, such as hydrogen, diffuses to the anode catalyst where it later dissociates into ions, such as protons, and electrons. The ions, such as the protons, are conducted through the membrane to the cathode, but the electrons are forced to travel in an external circuit (supplying power) because the membrane is electrically insulating. On the cathode catalyst, molecules, such as oxygen molecules, react with the electrons (which have traveled through the external circuit) and ions, such as protons, to form the waste material(s), for example, water or in the case of hydrocarbon fuels, carbon dioxide and water.

"Donnan Dialysis" (DD) also known as Diffusion Dialysis employs ion-exchange membranes, wherein the driving force to a separation process is a difference in chemical potential. An example for such separation process is to remove solutes from aqueous solutions, while retaining proteins and larger components. Concentration difference is a common driving force for ion transport in Donnan Dialysis. For example, a negative ion (A−) can be driven out of a feed solution through Donnan Dialysis equipped with anion-exchange membranes, by utilizing a second alkaline stream. The concentration difference of hydroxide ions (OH—) between the two solutions compels the hydroxide ions to diffuse into the feed solution. This creates an oppositely directed electrical field driving an extraction of negative ions (A−) from the feed solution. More information regarding DD membranes may be found, for example, in http://www.jurag.dk/donnan.html which is herein incorporated by reference in its entirety.

"Electrodialysis", ED may refer to electro-membrane processes wherein the driving for the separation force is electrical current.

An "ionomer" and/or a "polyelectrolyte" may refer to a polymers and/or copolymers containing both ionic and hydrophobic groups. Typically polyelectrolyte have more ionic groups than ionomers.

A "polymer" may refer to a substance composed of molecules with large molecular mass composed of repeating structural units, or monomers, connected by covalent chemical bonds.

A "copolymer" may refer to a polymer derived from two (or more) monomeric species, as opposed to a homopolymer where only one monomer is used.

A "monomer" may refer to a molecule, such as a small molecule.

"Crosslinking" or "crosslink" may refer to the formation of covalent bonds linking one polymer and/or oligomer chain to another. Crosslinking may also be brought about by interactions other than covalent bonds such as electrostatic or hydrophobic interactions. Unless otherwise stated, crosslinking refers to covalent bonds.

An "oligomer" consists of a finite number of monomer units, whereas a polymer, at least in principle, may consist of a very large (such as an unbounded) number of monomers.

The term "diazonium" group or Salt, may refer to aromatic diazonium groups.

The term "aryl" may refer to a group, a functional group and/or a substituent (such as phenyl, benzyl and the like) derived from an aromatic ring, such as benzene ($C_6H_6$). An aryl may be unsubstituted or substituted with any substituent, such as an alkyl, alkoxy, amine or any other group.

SUMMARY

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other advantageous or improvements.

An aspect, of some embodiments of the disclosure relates to providing selective membranes, such as composite membranes, and/or films.

An aspect of some embodiments of the disclosure relates to providing and forming membranes and/or films (for example, from a polymer or blend(s) of polymers) having a given morphology which is stabilized, for example against swelling and chemical degradation, by covalent crosslinking and optionally, in addition, by hydrophobization. The membranes may be composite membranes. The films, such as thin films (for example, 5 nano meters to several microns) in a composite membrane, may be cast and/or placed and/or coated on a support layer, such as a porous support layer or a network. Thicker films (for example of tens of microns to millimeters (mm), such as, 0.025-0.5 mm) may be produced without a support layer. A composite membrane may include multiple layers such as films.

According to an aspect of some embodiment of the disclosure, the membranes (particularly the selective layer of the membrane) and/or films include crosslinking through aromatic diazonium groups. The crosslinking through aromatic diazonium groups may be accomplished by mixing an aromatic ionomer (containing ionic groups such as sulfonic carboxylic, phosphoric, quaternary ammonium) groups and an aromatic condensation polymer (such as polysulfone, polyphenylsulfone (PPS), polyethersulfone (PES), polysulfone (PSU) and polyetheretherketone (PEEK) containing aromatic amino groups. The resulted mixture may be cast and/or placed onto a support, and converting at least a portion of the amine groups into diazonium groups.

The diazonium groups may then be reacted or decomposed (for example by making the pH of the film neutral or basic, with or without heating or by keeping the pH of the film acidic and healing at elevated temperatures) to obtain the crosslinking in the membrane, coating and/or film.

In one embodiment, the ionomers based on aromatic condensation polymers are crosslinked through diazonium reactions through aryl coupling.

The membranes, coatings and/or films have good oxidant resistance.

In another embodiment, the diazonium derivatives may be used directly on the aromatic function of poly condensation aromatic polymers known as "engineering plastics" which are then crosslinked with S= to form diaryl sulfide crosslinks or crosslinked with diarylsufides.

Diazonium salts of monomers, oligomers and/or polymers may be used as an intermediate layer for fixing a top selective layer to an underlying support (in other words, introducing reactive groups to which the top selective layer which was based on amines could be bound). In addition, diazonium salts may be used to crosslink and bind the selective layer itself. To date the use of diazonium salts to crosslink and bind the selective layer itself, in particular the case of covalent crosslinking and binding chemically stable (oxidant and/or pH stable) layers, was not described or practiced. When using diazonium salts to crosslink and bind the selective layer itself the significant quantities of amine groups in the selective layer may be detrimental to oxidant stability of the resulted membrane and/or coating. Thus it is desirable to significantly reduce the quantity of amine or nitrogen containing groups by the diazonium reaction.

In some embodiments, the materials, membranes, coatings and/or films, coating process and crosslinking may be used to modify existing UF, NF and RO membranes to improve their performance with for example by improving rejection. Very thin chemically stable films (for example, less than 10 nano meters) can be placed and bound to existing NF and RO membranes to improve rejection without a significant loss of flux.

In some embodiments, the coatings can be used to modify existing DD and/or ED membranes or to make completely new DD and/or ED membranes for water purification and treatment and in industrial applications.

In one embodiment, the use of starting polymers, which have inherent chemical stability combined with crosslinldng steps give stable aryl bonds.

In some embodiments, the ionic (such as sulfonic) groups needed in part for selectivity and flux are on one polymer (such as an ionomer as sulfonated polyphenysulfone) and the ionic (such as sulfonic) groups that are partially involved in the crosslinking are on another polymer (such as sulfonated polyphenyleneoxide).

In some embodiments, adding hydroxylated aromatics to the ionomer and crosslinking by the formation of ether bonds more flexibility than sulfone crosslinks and thus better mechanical properties can be achieved. A combination of both sulfone and aromatic ether bonds can also be obtained.

An aspect of some embodiments of the disclosure relates to semipermeable membranes, a process for their formation and their application. The semipermeable membranes include a selective barrier. The selective barrier may be made of at least a single ionomeric or ionic polymer component (for example, polyelectrolyte or a copolymer with ionic and polar groups) which is stabilized by being a crosslinkable ionomer or ionic polymer. The selective barrier may also be made of a blend or mixture of ionomers or/and ionic polymer(s) and optionally contain additional component(s), such that at least one component is crosslinkable within itself or with/to at least one of the other components. The resulted selective membrane in each embodiment is stabilized with respect to swelling and/or other significant changes in morphology by the crosslinking. In addition, Loss of ionic groups may increase hydrophobicity, in addition to crosslinking reactions that occur primarily by the reactions of hydroxylated aromatics and/or —SH aromatics and/or sulfonated aromatics, and/or amino aromatics and/or aromatic diazonium salts. In another embodiment, the crosslinked selective layer of the composite, as described herein may also be chemically bond to its support, as for example in a composite of the ultrafiltration support.

In addition, loss of ionic groups may increase hydrophobicity and thus decrease possible swelling of the membrane.

In other embodiments, crosslinked ionic layers may be brought about by the crosslinking reaction of polyvinylidene fluoride (PVDF) groups through free radical reactions in such polymers as sulfonated polysulfone-block vinylidene fluoride polymers or sulfonated polyvinylidene fluoride. In other embodiments, PVDF membranes may be crosslinked through diazonium reactions where in the diazonium is reacted under conditions which generate free radicals which crosslink the PVDF polymer or polymer components.

The films and/or coatings referred to herein may be used, in accordance with some embodiments, in the fabrication of novel semipermeable membranes for application in, for example, RO, NF, UF, ED, Donnan dialysis and/or energy conversion devices, such as fuel cells and super capacitors.

In other embodiments, the materials, coating processes and crosslinking may be used to modify existing membranes such as UF, NF and RO and fuel cell membranes, in order to improve their performance, for example by improving rejection. Very thin films can be placed and bound to existing NF and RO membranes to improve performance, for example rejection, without a significant loss of flux. Higher rejections are significant, for example, for sea water desalination, boron removal, nitrate removal and many other applications.

In one embodiment, there is provided a membrane comprising an ionomer and/or polyelectrolyte crosslinked through aryl-aryl (—Ar—Ar—), aryl-ether-aryl (—Ar—O—Ar—) and/or aryl-sulfide-aryl (—Ar—S—Ar—) bonds. The ionomer and/or electrolyte comprises a sulfonic, carboxylic, phosphoric, quaternary ammonium group or any combination thereof. The membrane may be a composite membrane.

The membrane may be selected from the group consisting of composite nanofiltration (NF), reverse osmosis (RO) and ultrafiltration (UF) membrane. The membrane may be a gas separation membrane. The membrane may be an ion exchange membrane. The ion exchange membrane may be adapted for use in electro dialysis (ED), Donnan dialysis (DD), or fuel cells.

The ionomer and/or electrolyte may be a film and/or coating crosslinked to a support layer through covalent bonds.

The support layer may include an ultrafiltration (UF) membrane or a microfiltration (MF) membrane. The ionomer and/or electrolyte may be crosslinked to the support layer through aryl-aryl, aryl-ether-aryl and/or aryl-sulfide-aryl bonds.

The ionomer and/or polyelectrolyte may include an aromatic condensation polymer. The aromatic condensation polymer may include polysulfone (PSU), polyphenylsulfone (PPS), polyphenylene sulfone, polyethersulfone (PES), polyetherketone, polyether ketone ether ketone, a combination of polyether ketone and polysulfone, polyphenylene sulfide, phenylene sulfone, a combination of sulfide and sulfone, poly ether based on polyphenylene oxide, 2,6 dimethyl phenylene, or any derivative thereof and/or any combination thereof.

The membrane may further include an additional polymer, the additional polymer comprises a sulfonated polymer and/or a fluorinated polymer. The fluorinated polymer may include polyvinylidene fluororide (PVDF), polyteterafluoroethylene(PTFE), poly hexafluoropropylene(PHFP), polychlorotrifluoroethylene(PCTF) and co and/or tripolymers thereof. The co and/or tripolymers may include PVDF-co-PTFE, PVDF-co-PTFE, PVDF-co-PHFP, PVDF-co-PCTF Poly(perfluoro dioxoles) as a homopolymer, copolymers with a fluorinated monomer, partially fluorinated polymers alpha substituted, non-substituted tri-fluorinated polystyrenes or any combination thereof. The ionomer and/or polyelectrolyte may further include hydrophobic groups.

In another embodiment, there is provided a process for the preparation of a membrane including crosslinking an ionomer and/or polyelectrolyte to form aryl-aryl (—Ar—Ar—), aryl-ether-aryl (—Ar—O—Ar—) and/or aryl-sulfide-aryl (—Ar—S—Ar—) bonds.

In another embodiment, there is provided a process for the preparation of a membrane including forming a layer of an ionomer and/or polyelectrolyte on a selective surface of a UF membrane by filtration of an aqueous solution of the ionomer and/or polyelectrolyte, and crosslinking the ionomer and/or polyelectrolyte to form aryl-aryl (—Ar—Ar—), aryl-ether-aryl (—Ar—O—Ar—) and/or aryl-sulfide-aryl (—Ar—S—Ar—) bonds. The filtration may include vacuum filtration or pressure filtration.

In another embodiment, there is provided a process for the preparation of a membrane including forming a thin layer of an ionomer and/or polyelectrolyte on a surface of a UF or a MF membrane by coating of an aqueous solution of the ionomer and/or polyelectrolyte onto the selective surface of the OF or MF membrane, and crosslinking the ionomer and/or polyelectrolyte to form aryl-aryl (—Ar—Ar—), aryl-ether-aryl (—Ar—O—Ar—) and/or aryl-sulfide-aryl (—Ar—S—Ar—) bonds. The process may further include of evaporating the coating solution prior to crosslinking. The aryl-sulfide-aryl bonds may be further oxidized to produce aryl-sulfone-aryl (—Ar—$SO_2$—Ar—) bonds.

The crosslinking may include coupling an aryl diazonium salt of a multifunctional monomer, oligomer or polymer to an aryl group of the ionomer and/or polyelectrolyte, thereby obtaining an aryl-aryl bond. The crosslinking may include coupling a hydroxy (—OH) aryl of a multifunctional monomer, oligomer or polymer to an aryl group of the ionomer and/or polyelectrolyte, thereby obtaining aryl-ether-aryl bonds. The coupling may be conducted by a redox coupling reagent. The coupling may be conducted under acidic conditions. The redox coupling reagent may include $K_3Fe[CN]_6$. The hydroxy (—OH) aryl of the multifunctional monomer, oligomer or polymer was obtained from the conversion an aryl diazonium salt to of the multifunctional monomer, oligomer or polymer to the hydroxy (—OH) aryl.

The crosslinking may include coupling an aryl diazonium salt of the multifunctional monomer, oligomer or polymer to an aryl sulfide (—SH) of the ionomer and/or polyelectrolyte, thereby obtaining aryl-sulfide-aryl bonds. The crosslinking may include coupling an aryl diazonium salt of the multifunctional monomer, oligomer or polymer to a hydroxy (—OH) aryl of the ionomer and/or polyelectrolyte, thereby obtaining aryl-ether-aryl bonds. The diazonium salt may be produced from an amine group, such as aromatic amino group. The polymer may include an ionomer and/or polyelectrolyte.

The crosslinking may be conducted at a temperature lower than 120° C. The crosslinking may be conducted at a temperature lower than 100° C. The crosslinking may be conducted at a temperature lower than 80° C. The crosslinking may be conducted in aqueous solution. The crosslinking may be conducted under mild conditions. The crosslinking may be conducted in acidic conditions.

The coating solution applied to the UF surface of a UF or a MF membrane by coating support layer may include a fluorinated or perfluorinated polymer having sulfonic groups. The coating solution applied to the surface of the UF or MF membrane may include at least a fluorinated or perfluorinated polymer having sulfonic groups selected from Nation, Dow or Aciplex-S polymers. The coating solution applied to the surface of the UF or MF membrane may include at least a fluorinated or perfluorinated polymer and an additional polymer soluble in the same solvent or solvent mixture as the fluorinated or perfluorinated polymer. The coating solution applied to the surface of the UF or MF membrane may include a sulfonated engineering plastic.

The UF membrane may be asymmetric UF that may include polysulfone (PSU), polyphenylsulfone (PPS), polyphenylene sulfone, polyethersulfone (PES), polyetherketone, polyether ketone ether ketone, a combination of polyether ketone and polysulfone, polyphenylene sulfide, phenylene sulfone, a combination of sulfide and sulfone, poly ether based on polyphenylene oxide, 2,6 dimethyl phenylene, or any derivative thereof and/or any combination thereof. The UF membrane may include an additional polymer, said additional polymer comprises a sulfonated polymer and/or a fluorinated polymer. The fluorinated polymer may include polyvinylidene flurororide (PVDF), polyteterafluoroethylene (PTFE), poly hexafluoropropylene(PHFP), polychlorotrifluoroethylene(PCTF) and co and/or tripolymers thereof. The co and/or tripolymers may include PVDF-co-PTFE, PVDF-co-PTFE, PVDF-co-PHFP, PVDF-co-PCTF Poly(perfluoro dioxoles) as a homopolymer, copolymers with a fluorinated monomer, partially fluorinated polymers alpha substituted, non-substituted tri-fluorinated polystyrenes or any combination thereof. The UF membrane may include an asymmetric UF support comprising a mixture of an organic and an inorganic filler.

In accordance with additional embodiments, there is provided a process for the preparation of a membrane including crosslinking an aromatic anionic ionomer, in an acidic environment, in the presence of glycerol and in a temperature below 120° C. (such as below 100° C., or below 80° C.). The ionomer may include sulfonated polyphenysulfone (SPPS). The crosslinking may include crosslinking an aromatic anionic ionomer and an aminated aromatic polymer. The aminated aromatic polymer may include aminated polyphenylsulfone. The crosslinking may be conducted on a UF or a MF support membrane (for example to form a thin film of\r a coating) or the crosslinking may be conducted to form a thicker film.

In accordance with additional embodiments, there is provided a process for the preparation of a membrane including crosslinking an ionomer and an hydroxylated aromatic polymer, in an acidic environment and in a temperature below 120° C. (such as below 100° C., or below 80° C.). The ionomer may include sulfonated polyphenysulfone (SPPS). The hydroxylated aromatic polymer may include Polystyrene hydroxyl (PstyOH). The crosslinking may be conducted in the presence of glycerol. The crosslinking may include crosslinking an ionomer, an hydroxylated aromatic polymer and an aminated aromatic polymer. The aminated aromatic polymer may include aminated polyphenylsulfone.

DETAILED DESCRIPTION

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

1) Choice of materials: The use of ionic aromatic polycondensation polymers and aromatic monomers, oligomers and polymers, including for example, amine, hydroxyl, sulfide (—SH), and fluorovinylidene oligomers and polymers (—$CH_2$—$CF_2$-)n, derivatives to make and crosslinked membranes, films and/or coatings:

1a) In one preferred embodiment, chemically stable aromatic condensation polymers that contain ionic charge (such as, sulfonic, phosphonic, carboxylic, quaternary ammonium groups), and hydrophobic aromatic moieties and on the same or different polymer aromatic amino groups for crosslinking may be used. The aromatic amino groups are converted to a diazonium which is then used directly or as an intermediate to form one or more other groups (such as, hydroxyl, sulfide) that crosslink through one or more of the following bonds: through the diazonium groups direct aryl coupling (in effect aryl-aryl), or through hydroxyl groups or sulfide groups aryl coupling through ethers, sulfides or sulfones. In another mode of crosslinking, block fluorovinylidene oligomers and polymers (—$CH_2$—$CF_2$-)n, with other blocks of ionic or hydrophilic engineering plastics can be crosslinked through free radical reactions on polyvinylidene fluoride.

2) Methods of Stabilization of the Membrane, Film and/or Coating 2.1) Methods of Crosslinking 2.1a) Crosslinking by Direct Aryl Coupling Direct aryl coupling may be a preferred approach as it requires only the multifunctional monomer, oligomer or polymer with an aromatic diazonium group that may undergo crosslinking with the polymer containing the ionic groups and if ionic oligomers and polymers are used with the diazonium then with the same polymer or oligomer. Thus a polymer or oligomer with both ionic and diazoniums can self crosslink.

2.1b) Crosslinking which Includes Oxidative Coupling of Aromatic Hydroxyl Groups.

If the aromatic diazonium is converted to a hydroxyl group then it may undergo by oxidative coupling crosslinking with the polymer containing the ionic groups and if oligomers and polymers are used with the aromatic hydroxyl groups then with the same polymer or oligomers. Thus a polymer or oligomers with both ionic and diazonium groups can self-crosslink.

2.1c) Crosslinking Reactions Between Aryl Diazoniums and Aromatic Hydroxy and —SH Groups.

If the membrane, film or blend is composed of an ionic polymer with a polymer that contains a diazonium group then if polymers with aromatic hydroxyl groups and/or aromatic —SH groups are also present then the diazonium can crosslink through both aryl coupling and the reaction between the diazonium and aryl hydroxyl and —SH groups to form aryl ether and sulfide bonds respectively. These aromatic hydroxyl groups may be on either different polymers or the same polymer as the ionic group. Instead of polymers it is understood that some of the polymers may be replaced with multifunctional monomers or oligomers.

2.1d) Crosslinking of Non Ionic Polymers by Diazonium Aryl Coupling and Oxidative Coupling.

Direct aryl coupling with a diazonium group may undergo binding or crosslinking with aromatic hydrophobic or polar polymers or oligomers. This is an important aspect as it may also be used to modify the hydrophobic hydrophilic balance of the membranes, films and/or coatings. In another embodiment, it may be used to bind the films or coatings to a support as in the formation of composites. In this case at least one component of the coating reacts with the underlying material of the porous In another embodiment, a mixture of the polymer with the precursor to the diazonium salt (such as, amino) may be mixed with the polymer used to make the porous membrane (such as, polysulfone or polyethersulfone or polyetherketone used to make ultrafiltration membranes) the support can then be cast and the diazonium may subsequently be generated to crosslink the support. This may, for example, be used to form solvent stable ultrafiltration and microfiltration membranes and supports.

2.1e) Crosslinking Using Aromatic Hydroxy Through Oxidative Coupling.

Crosslinking may be achieved through oxidative coupling of aromatic hydroxyls. Where aromatic hydroxyls are used, oxidative coupling may also be used in addition to other crosslinking mechanisms.

2.1f) Crosslinking Through Free Radical Reactions on Polyvinylidene Fluoride.

In another mode of crosslinking block fluorovinylidene oligomers and polymers ($—CH_2—CF_2-$)n, with other blocks of ionic or hydrophilic engineering plastics can be crosslinked through free radical reactions on polyvinylidene fluoride.

2.1g) Combination of Polyaromatic Polymers with Sulfonic Groups and a Polyaromatic Hydroxyl Group Reacted at Elevated Temperature with Glycerol to Give Crosslinked Membranes Films and/or Coatings (Mechanism not Established).

In one embodiment, in the use of ionic (such as, sulfonic) aromatic polycondensation polymers with a hydroxy aromatic derivatives under acidic conditions to make and crosslink selective membranes, films and/or coatings, the addition of glycerol to the combination is found to enhance crosslinking.

2.1h) The Combination of Polyaromatic Polymers with Sulfonic Groups with Agents Such as Glycerol to Enhance or Make and Crosslink Selective Membranes, Films and/or Coatings (Mechanism not Established).

In another embodiment, this is similar to section (2.1h) but without an aromatic hydroxy oligomer or polymer. The combination of only the ionic polymer and glycerol also crosslinks but may be less effective than the combination disclosed in (2.1h) which includes the hydroxy aromatic materials.

2.2) Methods of Stabilization by Hydrophobization

Polymers such as sulfonated polyphenylene oxide readily loose their sulfonic groups upon heating with acid. Thus mixtures of ionomers with relatively stable ionic groups mixed with this polymer or similar aromatic polymers that can loss their ionic groups can be stabilized by loss of the sulfonic group which introduces hydrophobization.

3) Preferred Polymers and Functional Group Combinations.

Preferred polymers may be based on engineering plastic such as but not limited to, polysulfone, polyethersulfone, polyphenylsulfone, polyphenylene sulfone, polyetheretherketone, polyetherketoneetherketone (PEKEK), polyphenylene oxides and their copolymers which are derivatized prior to membrane formation or during membrane formation with ionic, amino, diazonium, hydroxyl, sulfide, azo and sulfone groups.

4) Variables in Fabrication of the Membranes, Films and/or Coatings Disclosed Herein 4a) In achieving a given morphology of the selective membrane, film and/or coating the choice of components and the details of fabrication, such as the sequences in which the components of the coating solution are added, the solvents used, pH and temperatures, post treatments, multiple layers vs. single layers may be important considerations and are covered, in any variation and/or combination, under the scope of this disclosure.

4b) The possibility of using of environmental friendly and non toxic solvents may also an advantage. For example, the thins film of the composite membrane disclosed herein may be formed by coating an existing porous support, such as UF support, wherein the solvent for the coating is from an essentially aqueous/alcohol solvents which does not attack the support. This solvent combination may also contain other solvents and additives as solvent which may for example help to avoid collapse of the support on drying or maintain the integrity of the film. Example of a preferred additive is glycerol, which helps to prevent support collapse or compaction upon drying or heating during crosslinking or post treatments.

5) Chemical Binding of the Selective Membrane, Film and/or Coating Layer to its Support.

Composite membranes wherein the thin selective film is not only crosslinked but also chemically bound to the porous support component of the composite (see 2.1e above).

6) Stability Characteristics of the Disclosed Membranes, Films and/or Coatings

With respect to selective barriers, the disclosed membranes, films and/or coatings may have superior combinations of chemical stability, flux or permeation rates and selectivity over membranes of the state of art. The chemical stability may refer for example, to oxidants, and/or acids, bases and/or solvents stable membranes and/or films.

7) The Extent of Crosslinking of the Disclosed Membranes, Films and/or Coatings

The crosslinking may involve essentially all the components of the membrane film and/or coating, or only the components containing the ionic groups, or only a crosslinked matrix in which the components with ionic charge are embedded but not chemically crosslinked.

8) Categories of the Disclosed Membranes—

The disclosed membranes may roughly be divided to the following groups, of course other grouping approaches may also be acceptable:

a) Composites NF, RO, UF
b) Crosslinked UF and MF supports by the disclosed chemistry c) Gas separation
d) Ion exchange membranes for ED, Dialysis and Fuel cells.

9) The Disclosed Coatings and Coating Processes for use in Modification of Existing Membranes In another embodiment, the materials, coatings, coating processes and crosslinking processes may be used to modify existing membranes, such as commercial UF, RO, NF, ion exchange and gas separation membranes, to improve their performance, for example by improving rejection. Very thin films can be placed and bound to existing NF and RO membranes to improve rejection without a significant loss of flux. Higher rejections for example for sea water desalination or improved boron removal or nitrate removal in sea and brackish water membranes to name a few applications.

10) Morphologies of the Disclosed Membranes, Films and/or Coatings

The selective films and/or coatings of the membranes disclosed herein may include, for example, homogeneous single polymer, a homogeneous or heterogenous blend of at least two polymers or other components (such as, inorganic or ceramic or metals or acids and bases particles of nano or micron dimensions), or a mosaic distributions of one or more components in a matrix of another component.

11) Single and Multiple Layers

The selective membranes, films and/or coating may include a single layer or multiple layers (such as two or more, three or more, the or more layers).

12) Other application of the disclosed materials, methods, processes, membranes, films and/or coating may be used for chemically and mechanically stabilizing different surfaces such as glass, metals, ceramics or any other surface, such as for coatings on structural materials in homes, factories, businesses, boats, cars, planes, sporting equipment, military equipment, windows, electronic equipment, and the like.

In one embodiment, the present disclosure relates to novel permselective barriers and the membranes they form with many applications as for example in water desalination, treatment of industrial process and waste streams and energy conversion devices. The following category membranes are included in the disclosure-NF, RO, UF, gas separation and ion exchange membranes for ED, Dialysis and Fuel cells. With respect to selective barriers the disclosed membranes have superior combinations of chemical stability, flux or permeation rates and selectivity's over membranes of the state of art. The chemical stability refers to oxidant, acid, base and solvent stable membranes or films. The membranes of this disclosure may be in all possible configurations as for example flat sheets, spiral wound, hollow fibers, capillaries, tublets, and tubes. The disclosed selective barrier of these membranes is based on building blocks chosen from polymers or polymer segments or monomers. The chemical functions of these building blocks and the methods of forming the final membranes are designed for achieving a relative advantage is high chemical stability (oxidant, pH and optionally solvent stability) while retaining high flux and selectivity for a given application. Thus the characteristics of the disclosed membranes are chemical stability with good selectivity and flux with minimal fouling and ease of cleaning. The polymers used to achieve these performance characteristics are chosen in preferred embodiments of this disclosure to have good oxidant and chemical stability and are preferably chosen from aryl polymers (In effect polymers with aromatic rings in their backbone which contain prior to their final form in the selective barrier on at least on some of these aromatic rings anionic groups (for example, aryl sulfonic, phosphonic, carboxylic, phosphonic), or cationic groups (for example quaternary ammonium, amino, diazonium), neutral or polar groups or moieties (for example, hydroxyl, amino, sulfhydryl, halogen,).

In another embodiment of the disclosure, the materials, and coating process and crosslinking may be used to modify existing UF, NF and RO membranes to improve their performance with for example by improving rejection. Very thin films can be placed and bound to existing NF and RO membranes to improve rejection without a significant loss of flux. Higher rejections for example for sea water desalination or boron removal or nitrate removal to name a few applications Crosslinking is an important aspect of achieving stable membranes. The extent of crosslinking of the disclosed membrane, film or coating the crosslinking may involve all the components of the membrane film or coating, or only the components containing the ionic groups, or only a crosslinked matrix in which the components with ionic charge are embedded but not chemically crosslinked.

In one embodiment, there is provided the use of chemically stable aromatic condensation polymers that contain ionic charge (such as, sulfonic, phosphonic, carboxylic, quaternary ammonium groups), and hydrophobic aromatic moieties and on the same or different polymer aromatic amino groups for crosslinking. The aromatic amino groups are converted to a diazonium which is then used directly or as an intermediate to form one or more other groups (such as, hydroxyl, sulfide) that crosslinks through one or more of the following bonds: Direct aryl coupling (in effect aryl-aryl), or aryl coupling through ethers, sulfides or sulfones. In direct aryl coupling decomposition or conversion of diazonium salts into radicals or cations followed by coupling. Alternatively but less preferred azo bond formation through the diazonium followed by treatment which decomposes at least 10% of the azo bonds to form aryl radicals and coupling Thus in one case the selective barrier contains ionic groups that are crosslinked by at least aryl-aryl coupling, and/or aryl ether aryl (aryl-O-aryl), and/or aryl-sulfide-aryl (aryl-S-Aryl) or/and aryl-sulfone-aryl (aryl-S(=O)2-aryl) bonds. Two important mechanisms of crosslinking are aryl coupling and oxidative coupling. As they can crosslink both derivatized and non derivatized aromatic rings of a polymer or oligomers. The is important for binding thin selective films to porous supports and for the efficient crosslinking of films in general that contain both derivatized and none derivatized components. A second important crosslinking mechanism is the crosslinking through aryl-O-aryl or aryl-S-aryl moieties by reaction of stable aromatic polycondensation polymers containing diazonium groups with aromatic hydroxyl containing monomers, oligomers and polymers or sulfide (S=) or aromatic monomers, oligomers and polymers sulfides (—SH), optionally followed by oxidation to aryl sulfones. A third mechanism of crosslinking is oxidative coupling of hydroxyl containing monomers, oligomers and polymers.

The disclosure may also be defined in one embodiment as a polymer blend which contains at least a polymer component with ionic groups and hydrophobic monomers (as for example ionomers) or insoluble polymeric electrolytes and another polymer component containing other groups that can undergo crosslinking to give a crosslinked selective barrier by the crosslinking groups. Wherein the other groups which may be used to bring about this crosslinking of the selective film or barrier are preferably an amino and/or diazonium, and/or hydroxyl and/or —SH groups and in one embodiment the diazonium, and hydroxyl, and —SH may be derived starting from amino groups. The aromatic amino groups in this disclosure is primarily used to form other groups which then undergo crosslinking.

Instead of (or in addition to) the ionic and crosslinking moieties being on different polymers there is also provided, according to some embodiments, a blend of different polymers where at least one of the polymers of the blend contains both the ionic groups and the other groups which can undergo crosslinking as in A and B above to form a crosslinked film or barrier. Or another embodiment of the disclosure where the selective barrier or selective film is not a blend of different polymers but is made of only one polymer which contains both ionic groups and the other groups which can undergo crosslinking.

Direct aryl coupling in one preferred approach as it requires only the monomer, oligomer or polymer with a diazonium group that may undergo crosslinking with the polymer containing the ionic groups and if oligomers and polymers are used with the diazonium then with the same polymer or oligomer. Thus a polymer or oligomer with both ionic and diazoniums can self crosslink. If the diazonium is converted to a hydroxyl group then it may undergo by oxidative coupling crosslinking with the polymer containing the ionic groups and if oligomers and polymers are used with the aromatic hydroxyl groups then with the same polymer or oligomer. Thus a polymer or oligomer with both ionic and diazoniums can self crosslink. If oligomers and polymers are used with the aromatic —SH groups then it reacts with the diazonium group. This polymer or oligomer forms an aromatic-S-aromatic crosslink.

If the membrane, film or blend is composed of an ionic polymer with a polymer that contains a diazonium group then polymers with aromatic hydroxyl groups and or aromatic —SH groups can react with the diazonium and can crosslink the through both aryl coupling and the reaction between the diazonium and aryl hydroxyl and —SH groups. These aromatic hydroxyl groups may be on either different polymers or the same polymer as the ionic group. Instead of polymers it is understood that some of the polymers may be replaced with multifunctional monomers or oligomers.

Direct aryl coupling with a diazonium group that may undergo crosslinking with the non-ionic repeat units of the polymers or with non ionic aromatic hydrophobic or polar polymers or oligomers. This is an important aspect of the disclosure as it may also be used to modify the hydrophobic hydrophilic balance of the membrane film or coating by crosslinking into it a hydrophobic or polar component. In another embodiment, it may be used to bind the film or coating to a support as in the formation of composites. And in another aspect it may be used to form solvent stable ultrafiltration and microfiltration supports.

Thus the membranes disclosed herein may be composed of at least ionic polymers and for many applications especially anionic polymers crosslinked by at least one or more of the following crosslinking bonds a) aryl-aryl b) aromatic ethers c) aromatic sulfides and d) aromatic sulfones. Preferred polymers are based on engineering plastic such as polysulfone, polyethersulfone, polyphenylsulfone, polyetheretherketone, and polyetherketone which are derivatized prior to membrane formation or during membrane formation with ionic, amino, diazonium, hydroxyl, sulfide, azo and sulfone groups. In one preferred case the ionic groups are aryl sulfonic, phosphonic or carboxylic groups blended with a polymer which contains aromatic amine groups, such as aminated polysulfone, polyethersulfone and polyphenylsulfone. The amino groups can then be converted to diazonium salts and from diazonium salts which then undergo crosslinking through aryl coupling or through formation of aryl sulfide by the reaction with S= or aryl sulfides, which the sulfides may then be converted to sulfones. Or where the diazonium group is converted to hydroxyl groups or sulfide groups which then can undergo oxidative coupling. Thus 1) In one embodiment the diazonium groups can be used to crosslink the polymer film blend to form ary-aryl coupling and/or azo bonds which can be further decomposed to form ary-aryl bonds. The crosslinked membrane film or coating may also contain some residual azo crosslinks, but it is referred to have this bond minimal because of their relatively poor oxidative stability.

2) In another embodiment the diazonium groups can then undergo crosslinking through aryl coupling or through formation of aryl sulfide by the reaction with S= or aryl sulfides, which the sulfides may in another embodiment then be converted to sulfone groups by oxidation.

3) In another embodiment blends where the reactive polymer are hydroxyl groups can undergo crosslinking under acidic conditions resulting in aromatic ether crosslinks. The same aryl hydroxyl groups can also be used to crosslink by redox coupling reagents (for example, K3Fe[CN]6 and/or free radical sources such persulfate/metabisulfite to form aromatic ether bonds.

4)

In addition, the selective barrier may contain engineering plastic polymers such as polysulfone, polyethersulfone, polyphenylsulfone, polyetheretherketone and polyetherketones which have not been derivatized in addition to the polymers with the functional groups describe above. These non derivative engineering plastic polymers preferably are also crosslinked through the crosslinking reactions of the derivatized polymers, oligomers or monomers through the procedures involving aryl coupling and oxidative coupling.

In another embodiment, a composite or a self standing selective film comprising a polymer blend where at least two different polymers both have sulfonic groups but wherein the sulfonic group on one polymer can more readily undergo sulfone formation and the sulfonic group on the other polymer cannot. For example the blend of sulfonated polyphenyl sulfone and sulfonated 2,6dimethylphenylene oxide wherein the latter polymer is more easily crosslinked or desulfonated than the former polymer.

Linear polymers or polymer segments without aromatic moieties in their backbone may also be used in combination with the aryl polymers when they are preferably oxidant and chemically stable as for example when chosen from fluorinated and perfluorinated polymers which may also contain anionic groups such as sulfonic groups. In this case crosslinked ionic layers are brought about by the crosslinking reaction of polyvinylidene fluoride (PVDF) groups through free radical reactions in such polymers as sulfonated polysulfone-block vinylidene fluoride polymers or sulfonated polyvinylidene fluoride. In still another aspect PVDF membranes are crosslinked through diazonium reactions where in the diazonium is reacted under conditions which generate free radicals which crosslink the PVDF polymer or polymer components.

Achieving the morphology needed for the required membrane selectivity is another important aspect. The selective films of the membranes may be homogeneous single polymer, a homogeneous blend of at least two polymers or other components (for example, inorganics or ceramics or metals), heterogenous blend of at least two polymers or other components (for example, inorganics or ceramics or metals) or a mosaic distributions of one or more components in a matrix of another component. The selective films may be a single layer as described or at least two layers which each layer.

In achieving a given morphology needed for the selective film the choice of components and the details fabrication such as the sequences in which the components of the coating solution are added, the solvents, pH and temperatures, post treatments are important considerations. For example typical solvent combinations of this disclosure can be water with alcohols such as ethanol, propanol and butanol. These solvent mixtures are an advantage in that they will not attach many polymeric supports and are environmentally friendly. Other solvents such as THF, ethyl acetate, and aprotic solvents can be used as long as their final concentration is sufficiently low to prevent attach on the support being coated. Glycerol may also be added as a components as a solvent and as a component that prevents collapse of some porous supports upon heating. The possibility of using of environmental and non toxic solvents is also an important aspect. Methods of forming the selective films from the above that achieve the morphologies required for the desired selectivity's. For example coating the film at one pH, and then crosslinking at a second pH. Or the use of counter ions for the ionic groups such as multivalent counter ions chosen from the alkaline earth (Mg, Ca and others) or transition metals or their oxides or alkyl oxides (Ti, Zr, Zn and others) to orient the films by complexation or by the use of other additives such as water soluble polymers which introduce viscosity in the forming films and/or orientation.

The present disclosure provides, according to some embodiments, selective membranes which may be a composite of a thin selective layer comprising an ionic aromatic polymer such as aromatic ionomer in one preferred case or crosslinkable aromatic polyelectrolyte or with properties between an ionomer and polyelectrolyte on a porous non selective support or the disclosed membrane may be a relatively thick "self-standing" selective membrane: Wherein the thin selective layer of the composite membrane or the relatively thick membrane is made in one embodiment with either a single self-crosslinkable ionomer or polyelectrolyte derivatized from engineering plastics or in another embodiment is a blend or mixture of components such that at least one of the components is an ionomer or non water soluble ionic polymer and at least one of the components is crosslinked to itself or to at least one of the other components of the blend, and thus the selective or thick membrane stabilized by crosslinking from excessive swelling and changes in density and selectivity. If a water soluble polyelectrolyte is present in the formulation used to make the membrane than in the final selective film it is crosslinked in one preferred embodiment. In another embodiment it may not be crosslinked and being water soluble may eventually leach out. Its function in this case being to achieve a certain thickness and morphological characteristics of the overall selective film during the process of formation. The polymeric components of this disclosure may be chosen from the category of aromatic homo-polymers co-, tri- and tetra-polymers, block copolymers and graft copolymers. In the preferred case the basic polymers for making the disclosed membranes, films and coatings of this disclosure are made form step polymerization reactions with or without subsequent polymer modifications. In one preferred embodiment the polymers are ionomers made by step polymerization reactions and in many cases by a condensation mechanism. In a preferred embodiment the polymers have aromatic groups in their backbone.

The thin selective layer of this disclosure is made by different methods such as the well known methods of coating a wet film onto a porous support and removing the solvent by evaporation or applying the coating solution under pressure or vacuum application followed by a crosslinking or curing step without significant heating or a heating step prior or during curing for further evaporation of residual solvents and/or heat curing step to initiate a chemical reaction that brings about or completes a curing crosslinking reactions, and an optional coatings and/or optional non-coating post-treatment. There may also be an intermediate layer between the porous support and the selective layer. The step that is used to crosslink the selective layer may also be used to chemically bind the selective layer to the support.

Different types of crosslinking are covered under the scope of this disclosure:

1) Aromatic hydroxyl groups which form ether bonds by one or more of the following methods a) under acidic pH and elevated temperature and b) under conditions of oxidative coupling using a redox couple such as potassium ferricyanide and c) hydroxyl free radicals formed from a free radical source and 2) Decomposition or conversion of diazonium salts into radicals or cations followed by coupling. Alternatively azo bond formation through the diazonium followed by treatment which decomposes at least 10% of the azo bonds to form aryl radicals and coupling. An important embodiment of the coupling through diazonium reaction and through oxidative coupling is the chemical binding of the thin film coating to the underlying supports may occur which is a preferred case is the support is based on aromatic condensation polymers such as polysulfone, polyphenylsulfone, polyphenylene sulfone, polyethersulfone, polyetherketones and the like. This binding increases stability and in some cases allows back washing to minimize fouling or to remove foulants.

3) Aromatic sulfonic groups which crosslink under acidic pH and elevated temperature and especially in the presence of solvents or agents such as glycerol.

Combination of different types of crosslinks can be achieved such as by way of example a) Sulfone formation and aryl ether bonds, b) aryl-aryl coupling and azo bonds, c) aryl ether bonds and aryl-aryl coupling bonds, d) sulfone bond bonds with aryl-aryl coupling, In this connection there are different approaches to crosslinking in which the ionic charge is based on a sulfonic groups and which the sulfonic groups in the presence of acidic conditions and agents such as glycerol may appear to facilitate crosslinking. Thus in one embodiment there are two types of sulfonic groups. In effects sulfonic groups on one polymer that do not readily undergo crosslinking, and the sulfonic groups for crosslinking are on another polymer. Similarly in the approach to crosslinking through aromatic ether bond formation or diazonium salt decomposition to free radical method for aryl oxidative coupling, or aryl-aryl coupling respectively for example, one polymer contains the hydroxyl groups which undergo oxidative coupling or amino groups which are convertible into diazonium groups and the second polymer contains the sulfonic groups and are not converted by the crosslinking reaction and thus crosslinking and ion exchange capacity can be independently controlled. In some cases aromatic amino groups can be converted in part to hydroxy groups and the polymer would contain a mixture of hydroxy and amine groups where the amine group can then undergo conversion to diazonium for forming aryl-aryl coupling and the hydroxy groups can be used to form aryl ether bonds. In another embodiment sulfonic groups are on different moieties within the same polymer chain and those on one moiety undergo chemical crosslinking and in another case are on another moiety where they do not undergo reactions. In still another embodiment sulfonic groups are on different moieties within the polymer chain and other groups (for example —OH, —SH, —NH$_2$, Diazonium) which undergo reactions which form crosslinks are on one moiety other than which the sulfonic groups are placed. Such polymers (those which undergo crosslinking) may be random copolymers or block polymers or graft polymers with aromatic groups in their backbone. In all the above the sulfonic group which do not undergo crosslinking reactions may, for different applications be substituted totally or in part by phosphonic, and/or carboxylic acid groups.

A combination of both sulfone and aromatic ether bonds and aryl-aryl crosslinks can also be achieved by the disclosure of combining different modes of crosslinking in which mechanical properties may be optimized with respect to flexibility (ether crosslinks) and stiffness (sulfone crosslinks), and separation properties can be optimized by ionic capacity, degree of crosslinking and hydrophobicity can be independently controlled. One of the benefits of using blends containing the ionomer or polyelectrolyte and a second crosslinking polymer is that blend morphology can be can be controlled on the microstructure level by relative amounts of each polymer and cross-linking densities adjusted independently of the IEC and over a wide range of crosslinking densities. For example in the mixture of sulfonated polyphenylsulfone and sulfonated 2,6,-dimethylpolyphenylene oxide the quantity of sulfonic groups in the SPPS is maintained while the sulfonic groups of the SPPO go into making the sulfone crosslinks and/or introducing a hydrophobic component by loss of the sulfonic groups. In the case of using sulfonated polyphenysulfone (for example) and blending it with polymers with aromatic-OH or aromatic —NH$_2$ or aromatic diazoniums the means of crosslinking may be a) under conditions of oxidative coupling using a redox couple and/or b) hydroxyl free radicals formed from a free radical source and/or diazonium decomposition at different pH's to form aryl coupling reactions or less preferred but still applicable for certain applications azo coupling. Particular polymer combinations are by way of example a blend of a sulfonated aromatic engineering polymers (in one preferred case polyphenylsulfone or polysulfone, or polyetherketone or polyetheretherketone) with aminated aromatic engineering plastics (in one preferred case polyphenylsulfone, or polysulfone, or polyetherketone or polyetheretherketone)) for making thin layers of a composite membrane which are then converted through diazonium chemistry to form an ionic crosslinked layer. In addition to the sulfonic groups which do not participate in crosslinking other such groups may be used together or individually may be chosen from ionic groups such as phosphonic, carboxylic, quaternary ammonium and others, may also be used for a given applications.

While the composition of the selective layer may be mostly a given ionomer or/and other types of ionic polymers such a polyelectrolyte or polymers with properties between ionomers or polyelectrolytes, it may contain other materials such as additional crosslinkable ionomers, and/or polymers containing for example aromatic hydroxyl (polyphenols) or amino groups, or diazonium derived from aromatic amino groups or —SH, groups and/or or engineering plastics which contain or are modified by a chemical reaction to introduce hydroxyl, or amino, or —SH, or diazonium groups on the aromatic rings, and or sulfonated polymers such as sulfonated 2,6dimethyl polyphenylene oxide which undergo crosslinking and or loss of the sulfonic groups upon heating when the sulfonic groups are in the acid form and the like, under more mild conditions than sulfonated polysulfone for example. Thus sulfonated PPO may be crosslinked or hydrophobization to introduce physical crosslinks through a corresponding loss of sulfonic groups, respectively while the sulfonic groups on for example sulfonated polysulfone or polyethersulfone or polyphenylene sulfones remain. Instead of sulfonated PPO sulfonated PEEK and other polymers which are more readily desulfonated may be used in the same way. For example in one embodiment the selective layer will contain the sulfonated ionomer such as sulfonated polysulfone or sulfonated polyphenylsulfone or sulfonated polyethersulfone of sulfonated polyphenylene sulfide or perfluorinated polymers which are not crosslinked in the final selective layer in combination with materials which are more readily crosslinked in the final selective layer as by way of example sulfonated poly 2,6 dimethyl phenylene oxide and/or sulfonated PEEK, and/or hydroxylated aromatic polymers such as hydroxylated derivatives of the engineering plastics, under acidic conditions and heat optionally in the presence of agents such as glycerol. Or in another embodiment by oxidative coupling under less acidic (pH 3 to 6) neutral or basic pH with the addition of reagents such as potassium ferricyanide or other catalytic and non-catalytic oxidants which can bring about oxidative coupling under various conditions such as acidic or aqueous neutral basic conditions (such as, pH 7 to 13) in the presence of oxygen, or by the use of free radicals generated by redox reactions of under acidic or neutral pH of hydrogen peroxide and Fe (II) ions, and persulfate ions with Fe (H) ions or persulfate and metabisulfite and the like. Also included are methods with Ce(IV) and Maganic ions. Polymers such as polyvinyl alcohol, and/or polyhydroxystryrene are generally less preferred as compared to the other reactive polymers because they are less oxidant resistant, but may find use in certain applications.

According to another embodiment, the chemical binding of the thin film coating to the underlying supports based on aromatic polymers such as polysulfone, polyethersulfone, polyetherketone and the like, may increase stability and in some cases allows back washing to minimize fouling.

Some non-limiting preferred embodiments of the disclosure are:

1) One important crosslinking embodiment included in this disclosure is the coupling of aromatic groups through diazonium salts. In one approach this is by a free radical mechanism. In effect aromatic amines groups on the polymers (for example, Amino polyphenylsulfone or polysulfones based on bisphenol A) are converted to diazonium salts under acidic conditions which are then put under basic conditions to ultimately form free radicals which couple to form crosslinks This is based on arylation of aromatic compounds by diazonium salts (See Advanced Organic Mechanisms by J March 3rd addition, which is incorporated by references therein in its entirety).

In effect:

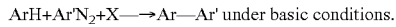
ArH+Ar'N$_2$+X—→Ar—Ar' under basic conditions.

When the normally acidic conditions of a diazonium salt is made alkaline the aryl portion of the diazonium salt can couple with another aromatic ring. In acid solution diazonium salts are ionic and their reactions are polar. When they cleave the product is an aryl cation. However in neutral or basic solutions diazonium ions are converted to covalent compounds, and these cleave to give free radicals.

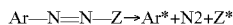
Ar—N=N—Z→Ar*+N2+Z*

In a second approach the coupling between aromatic groups occurs by the diazonium salts cleave under acidic conditions to form cations and these add to electron rich aromatic rings.

In one preferred embodiment of the coating formulation contains polymers with aryl primary amines (in effect H$_2$NAr— or —(H$_2$N)Ar—). The amines are converted to diazonium salts under acidic conditions and applied to the surface of the support or cast as a self standing film. The film is then dried and cured under acidic conditions. In another embodiment the film is cured under neutral or basic conditions to give aryl-aryl coupling by one possible mechanism such as free radical coupling. This curing may entail letting the membrane stand at ambient conditions or in heating in both cases either in the dry state or in solution as a function of the materials. In another variation the coating formulation which contains polymers with aryl primary amines (in effect terminal amines H$_2$NAr— or amines on the monomer units of the polymer-(H$_2$N)Ar—) is coated onto the support. After this coating step the coating may be dried and/or partially crosslinked. In the coated film the aromatic amines may be converted into diazonium salts. The diazonium salts of this coating may then be used to crosslink the coating by different conditions such as one or more of the following:

A) The film with the diazonium is heated under the acidic that remained in the film due to the formation conditions needed to form the diazonium salt.

B) Similar to "A" above but with the acidic conditions changed from that in which the diazonium salt was formed.

C) Changing the pH to neutral or basic conditions before curing the coated membrane by standing at ambient conditions in solution or dry or heating either in solution or in the dry state.

D) After diazonium salt formation the diazonium salt is converted to hydroxyl groups, but one of several methods known in the state of art such as heating in an aqueous solution of sulfuric acid. The formed aromatic hydroxyl groups are then used for oxidative coupling by placing the composite membrane or coating the composite membrane with a solution of an oxidative coupling catalyst such as potassium ferricyanide.

E) In the above cases of using diazonium pathways to crosslinking some azo coupling reactions may occur and this may be degraded thermally or otherwise to give free aryl radicals and additional coupling. A certain amount of residual azo bonds can be allowed.

The formation of aryl-aryl crosslinks through diazonium salts formed from primary amine containing polymers can also be applied by using monomers and oligomers of di or polyfunctional amines. For example of monomers diamino naphthalene, 1,1,1tris(aminophenyl)ethane or 1,3,5tris(aminophenyl)benzene, meta-phenylene and para-phenylene diamines.

2) The selective barrier of membranes made from aromatic ionic polymers such as polyelectrolyte or ionomers which have groups independently crosslinkable and non-crosslinkable ionic groups and can be self cured. By way of example aromatic condensation polymers that contain both sulfonic and hydroxyl groups with or without additives. The crosslinking may be brought about in one preferred embodiment by oxidative coupling through the hydroxyl groups. In a variations the polymer may contain the sulfonic groups or other ionic groups and a group which is a precursor to the hydroxyl group which by way of example may be an amino group which is converted to an hydroxyl group by nitrous acid and then acid hydrolysis of the resulting diazonium salt, or an acetate group which is converted to the hydroxyl group by hydrolysis.

3) The selective barrier of a membranes made from a blend of at least one crosslinked ionomer or ionic polymer and at least one crosslinkable polymer which may be ionic or polar hydrophilic (e.g., hydroxylated polyphenylsulfone) or hydrophobic polymers which may react to crosslink with itself or other components other than the non-crosslinkable ionic polymer and form a non swelling component for the non crosslinked ionomer or ionic polymer after a curing or post-treatment step.

4) The selective barrier of a membranes made from an at least one ionic polymer such as a polyelectrolyte or ionomers which can be self cured and an at least one additional crosslinkable hydrophilic or hydrophobic polymer which may or may not be a ionomer or polyelectrolyte each of which may crosslink independently to themselves and/or to first mentioned ionic polymer (polyelectrolyte or ionomers).

5) In one preferred case the crosslinking of the polymer is brought about by drying at elevated temperatures under acidic conditions the membrane such that the sulfonic or other anionic groups are in the acid form and there is present aromatic polyphenol compounds. In the case of heating such a combination at elevated temperature (60 to 150 C) under acidic conditions (such as, pH 1) the presence of solvents or agents such as glycerol which were found to facilitate the crosslinking. In a variation the polyphenols is in a precursor form which by way of example may be an amino group which is converted to an hydroxyl group by nitrous acid and then acid hydrolysis of the resulting diazonium salt, or an acetate group which is converted to the hydroxyl group by hydrolysis. This conversion to the hydroxyl form may occur during the coating step or after the film has been coated.

6) In another case reagents used in oxidative polymerization such as potassium ferricyanide, $MnO_2$ and other reagents cited in the state of art can be use to perform oxidative coupling of hydroxylated or hydroxyl containing compounds to themselves or to other components of the blend such as polymers in the precursor of the selective layer to perform crosslinking.

7) In another preferred embodiment, the crosslinking is brought about with the addition of a free radical source or initiator such as by way of example persulfate salts alone or in combination with reductants such as metabisufite, sulfite or thio sulfate or similar salts or Ceric salts which are used in grafting or Fenton's reagents and other components well known in the sate of art can initiate hydroxyl group radical formation on the aromatic hydroxyl group of polyfunctional monomers (in effect a relatively low molecular weight compound with more than one crosslinking reactive group), oligomers or polymers.

8) Selective barriers which are crosslinked through a combination of mechanisms described above such as by way of example to form for both sulfone and aromatic ether crosslinks. As by way of example to first effect crosslinking oxidative coupling through the aromatic hydroxyl groups of monomer or oligomers or polymeric components of the blend followed by crosslinking under acidic conditions to form additional aromatic sulfones. Or a process which first forms sulfone and/or aromatic ether bonds through curing under acidic conditions and this followed by oxidative coupling of remaining aromatic hydroxyl groups.

The aforementioned ionic or ionomer coatings may condensation homo aromatic polymers or a random polymer or a block-co- or tri-polymer, and in one preferred embodiment the ionic group is sulfonic. In other cases the polymer may contain additional or other ionic groups such as, $—PO_2H_2$, $—CH_2PO_3H_2$, $—COON$, $—OPO_2H_2$, $—OPO_3H_2$, $—OArSO_3H$. In another embodiment the ionic charge may be an anionic exchange groups such as ammonium, sulfoniums or phosphonium. In another embodiment the selective layer may have an amphoteric or mosaic charge distribution and contain both anionic and cationic exchange groups. For examples of phosphonates, see Solid State Ionics, 97 (1997), 177-186. For examples of carboxylated solid polymer electrolytes, see Solid State Ionics, 40:41 (1990), 624-627. For example, the ion-conducting material may comprise a sulfonated derivative of at least one thermoplastic aromatic polymers. The synthesis of such polymers is well known to the state of art [see for example, U.S. Pat. Nos. 4,413,106, 5,013, 765, 4,273,903 and 5,438,082, and Linkous, et al., J. Polym. Sci., Vol. 86: 1197-1199 (1998), which are incorporated herein by reference in their entirety].

The modification of aromatic polymers by lithiation has been reported, for example, in U.S. Pat. No. 3,402,144, which is incorporated herein by reference in its entirety. U.S. Pat. No. 3,639,337, which is incorporated herein by reference in its entirety, discloses conversion of poly-(2,6-diphenyl-1,4-phenylene oxide) to a copolymer by metalating the meta position of some of the phenylene rings and reacting the metalated product with carbon dioxide, an aryl aldehyde or a diaryl ketone is formed to produce polymers still retaining the high temperature characteristics of the poly(2,6-diphenyl)-1, 4-phenylene oxide) but having the added properties.

Methods or forming ionomers with different functional groups on polysulfones Polyarylene polyethersulfone and polyphenylsulfone. Such functional groups are aryl, allylthio, arylthio, allyl, carboxyl, carboxylic ester, —COOM' (wherein M' is a metal or ammonium), hydroxyl-containing substituent, a group of the formula $—C(OH)R_3$, $R_4$ (wherein $R_3$ and $R_4$ each represents hydrogen, alkyl or aryl), metal, metal-containing group, halogen-, sulfur-, phosphorus-, boron-, or nitrogen-containing group, thiol, sulfonyl, halogen, a group of the formula —SiR'R"R'" or —SnR'R"R'" (wherein R', R" and R'" each represent hydrogen, alkyl or aryl), the degree of derivitization on the polysulfone being from about 0.01 to about 3 non-hydrogen groups on average per repeating unit. More information can be found in the patents of Guiver et al such as U.S. Pat. Nos. 4,598,137, 4,797,457, 4,894,159, which are incorporated herein by reference in their entirety.

Methods of forming hydroxylated polysulfones are given in JP2000072965 and JP2000309707 which are incorporated herein by reference in their entirety.

Methods of amination of engineering plastics are well known in the state of art (for example Chapter 1 in "Chemical Reactions on Polymers" editors J. L. Benham and J. F. Kinstle, ACS Symposium Series 364 1988 which is incorporated herein by reference in its entirety) and can be used to form the polymer amine derivatives of this disclosure.

Thus in a preferred embodiments, the ionic polymers or ionomers of this disclosure are known as engineering plastics which have been modified after polymerization by methods of sulfonation, or carboxylation or phosphorylation or hydroxylation or amination or sulfhydryl or quaternization, through various synthetic pathways well known in the state of art and some of which procedures references are given above. Alternatively they may be formed by performing the polymerization of such polymers with ionic groups already on one of the monomer units. In this way the functional groups may be placed on different positions or different aromatic groups then when the same group is introduced on. For example as described above in US patent application 20060036064 by McGrath et al.

Some preferred polymers that may be used as described herein, in accordance with some embodiments of this disclosure, are those made from condensation polymerization (may also be called poly condensation polymers) for example, polysulfone, polyether sulfone, polyphenylene sulfone, polyetherketone, polyether ether ketone, polyether ketone ether ketone, polyphenylene sulfide, polyphenylene sulfone and variations of sulfide and sulfone in the same polymer and other variations of polyether ketones and polysulfones. In additional embodiments, there is provided polyethers based on polyphenylene oxide such as 2,6dimethyl phenylene, aromatic, and halomethylated derivatives of the above polymers. Thus some of the categories of the preferred ionic polymers may be derived from a polysulfone (PSU), polyphenylene oxide (PPO), polyphenylene sulfoxide (PPSO), polyphenylene sulfide (PPS), polyphenylene sulfide sulfone (PPS/SO$_2$), polyparaphenylene (PPP), polyphenylquinoxaline (PPQ), polyarylketone (PK) and polyetherketone (PEK) polymer. polyethersulfone (PES), polyetherethersulfone (PEES), polyarylethersulfone (PAS), polyphenylsulfone (PPSU) and polyphenylenesulfone (PPSO$_2$) polymer; the polyimide (PI) polymer comprises a polyetherimide (PEI) polymer; the polyetherketone (PEK) polymer comprises at least one of a polyetherketone (PEK), polyetheretherketone (PEEK), polyetherketone-ketone (PEKK), polyetheretherketone-ketone (PEEKK) and polyetherketoneetherketone-ketone (PEKEKK) polymer; and the polyphenylene oxide (PPO) polymer comprises a 2,6-diphenyl PPO or 2,6dimethyl PPO polymer. Preferred polyetherketone polymers include polyetherketone (PEK), polyetheretherketone (PEEK), polyetherketone-ketone (PEKK), polyetheretherketone-ketone (PEEKK) and polyetherketoneetherketone-ketone (PEKEKK) polymers. Other preferred ion-conducting materials for use in the present disclosure but less preferred because of their reduced oxidant stability include polystyrene sulfonic acid (PSSA), polytrifluorostyrene sulfonic acid, polyvinyl phosphonic acid (PUPA), polyvinyl carboxylic acid (PVCA) and polyvinyl sulfonic acid (PVSA) polymers, and metal salts thereof. More preferably, the ion-conducting material comprises a sulfonated derivative of a polysulfone, polyphenylsulfone (PPSU), polyphenylene sulfone, polyethersulfone (PES), polyphenylene sulfoxide (PPSO) and polyphenylenesulfide-sulfone (PPS/SO$_2$).

In addition to linear polymers or slightly branched polymer highly branched polymers may also be used. The above condensation polymers may also be made branched and more highly functionalized by the use of monomers with more than two functional groups. For example, Fritsch D, Vakhtangishvilli L. and Kricheldorf H R (2002) J of Macromolecular science A vol 39 (11): 1335-1347 and in J polymer Science A Vol 40 (17): 2967-2978 "Synthesis and functionalization of polyethersulfones based on 1,1,1tris (4-hydroxyphenyl) ethane" and in Weber et al US Patent Application No. 20040242807, which are incorporated herein by reference in their entirety.

Some preferred homopolymers and copolymers, examples being random copolymers, such as ®Victrex 720 P and ®Astrel. Especially preferred polymers are polyaryl ethers, polyaryl thioethers, polysulfones, polyether ketones, polypyrroles, polythiophenes, polyazoles, phenylenes, polyphenylenevinylenes, polyazulenes, polycarbazoles, polypyrenes, polyindophenines and, especially polyaryl ethers: Examples of commercial sources of some of these polymers are:. Solvay, ICI, BASF. For example, from Solvay UDEL™ polysulfone, RADEL™ A polyether sulfone and RADEL™ R polyphenylsulfone as well as SOLEF™ fluoropolymer Some other non-limiting examples of sulfonated ionomers and their degree of substitution are: Sulfonated polyphenylsulfone 0.8 to 2.5 meq/gr., Sulfonated polysulfone 0.8, to 1.8, Sulfonated polyether sulfone 0.6, to 1.4, Sulfonated polyether ether ketone 1.0 to 3.0, Sulfonated polyether ketone 0.8 to 2.5, Sulfonated PVDF and sulfonated PVDF copolymers of 1.0 to 2.5 meq/gr.

The counter ions of the ionomer or polyelectrolyte ionic groups may be chosen from a wide range during fabrication of the membrane or in there use', Examples are H+, Li+, K+, Na+, NH4+ and others and multivalent ions in some cases may be chosen from a large selection as by way of example Ca, Mg, Zn ions.

Other sulfonated polymer may also be derived from fluorinated polymers: polyvinylidene fluoride (PVDF, poly hexafluoropropylene (PHFP), polychlorotrifluoroethylene (PCTF), and co and terpolymers of the above such as PVDF-co-PTFE, PVDF-co-PTFE, PVDF-co-PHFP, PVDF-co-PCTF Also included are selective membranes based on partially fluorinated polymers alpha substituted and non-substituted tri-fluorinated polystyrenes.

Another polymer for forming the coating of the composite membrane is from perfluorinated vinyl ether with tetrafluoroethylene copolymer having sulfonic groups. Preferred types are based on the following formula such as commercial Nafion 115 (Gr/mole 1100) and Aciplex-S (Gr/mole 1000) and Dow (Gr/mole 800) In addition to sulfonic groups sulfonamides can also be used. The sulfonimide which is a very strong Bronsted acid and the strongest acid in the gas phase. Examples of such ionomers are based on bis[perfluoroalkyl) sulfonyl]imides are checked (for example, PMSE vol 80 p 598, 1999, which is incorporated herein by reference in its entirety).

Another useful category of polymers for derivitation into ionic polymers are polyphenylene polymers such as poly(p-phenylene) and poly(p-xylylene. Examples of such polymers are given in US patent application 20050261459, disclosed herein by reference in its entirety, disclosing, for example, polymers comprising monovalent endcappers, divalent linear units, and polyvalent branching units. The composition of the polymers is controlled by adjusting the ratio of the three types of monomers. Other polyphenylene polymer are disclosed in U.S. Pat. No. 5,227,457, semi-rigid as disclosed in U.S. Pat. No. 5,886,130, and may have reactive side groups as disclosed in U.S. Pat. No. 5,625,010 or end groups as disclosed in U.S. Pat. No. 5,670,564 Polyphenylenes may also have a branched (Kovacic et al., Chem. Rev., 1987, 87, 357-379), or hyperbranched structure (Kim et al., Macromol., 1992, 25, 5561-5572), all of which are incorporated herein by reference in their entirety.

In one embodiment, the crosslinkable ionic polymer is sulfonated 2,6-dimethylpolyphenyleneoxide (SPPO) which is in addition to the first non-crosslinkable ionic polymer or ionomer solution which the SPPO may be subsequently crosslinked chemically by sulfone formation or more readily may form physical crosslinks by the loss of sulfonic groups to form hydrophobic physical crosslinks in a relatively hydrophilic matrix. The ionomers that may be blended with SPPO are ionomer polymers which give good initial performance but which cannot be as readily crosslinked by themselves under the conditions that SPPO can be crosslinked (chemically or physically). They are blended together with the sulfonated PPO to give good results with respect to selectivity and reduced swelling which is needed for life time. Thus the unique combination of sulfonated PPO with ionomers such as sulfonated polysulfone (SPSu) or sulfonated polyphenylsulfone (SPPS), or sulfonated polyether ether ketone (SPPEK) and the other sulfonated or carboxylated or phosphonated engineering plastics (polymers) described above give optimum performance for some applications. The SPPO forms an insoluble non swelling matrix which maintains the morphological structure of the SPPS or SPSu or SPEEK and other sulfonated engineering plastics.

Some preferred sulfonated, carboxylated or phosphonated or hydroxylated polymers may be derived from, polyphenylsulfone, polyetherketone, polyetheretherketone polypropylene, polystyrene, polysulfone, polyethersulfone, polyetherethersulfone, polyphenylenesulfone, poly(bisbenzoxazol-1,4-phenylene), poly(bisbenzo(bis-thiazol)-1,4-phenylene), polyphenyleneoxide, polyphenylenesulfide, polyparaphenylene, In addition polytrifluorostyrene sulfonic acid, polyvinylphosphonic acid, and polystyrene sulfonic acid may be also used in some embodiments.

In another embodiment, the use of hydroxylated polymers such as or polyvinyl alcohol and or polyaromatic hydroxyl compounds such as polyhydroxystyrene or preferably for oxidative stability hydroxylated aromatic condensation polymers such as polyphenylene oxides (such as poly 2,6 dimethyl phenylene oxide), polysulfone, polyether sulfone, polyphenylene sulfone or Polyphenylsulfone, PEEK and others may be blended with the ionic polymers. The hydroxylated (—OH) containing polymers may self crosslink or crosslink also to the other components of the blend to form a matrix with reduced swelling or by oxidative coupling or upon heating the polymers with —OH groups under acidic conditions optionally in the presence of solvents and agents such as glycerol-, which the crosslinking maintains the morphological structure of the sulfonated polyphenylsulfone (SPPS) or sulfonated polysulfone (SPSu) or sulfonated polyethersulfone (SPES) or other sulfonated or ionic engineering plastics. Thus these polymers may be blended with ionomer polymers which give good initial performance but which cannot be readily crosslinked by themselves but when blended together with the hydroxylkated polymers give good results with respect to selectivity and reduced swelling which is needed for constant performance during the membranes operational life time. Thus the unique combination of hydroxylated polymers, preferably those of oxidant stable polymers or oligomers, with ionomers such as sulfonated polysulfone (SPSu), or sulfonated polyphenylsulfone (SPPS), and others give optimum performance which can be understood as a synergistic interaction of properties.

In addition to hydroxylated polymer, lower molecular weight crosslinkers such as monomers and oligomers may be chosen from the following non-limiting examples such as para, meta, ortho dihydroxy phenylenes and trishydroxy phenylenes, bis and tris(hydroxyphenol) on benzene, or methane or ethane or propane, (preferable tris 4-hydroxy phenol), bisphehol A or bisphenol B Equivalent aromatic amines which may be convert to the hydroxyl derivatives by well known methods of diazotization and hydrolysis can be used in some cases.

In the above cases the use of crosslinking under acidic conditions of hydroxyl and sulfonic containing polymers, glycerol and similar compounds enhances the crosslinking and its net effect. For example sulfonate polyphenylsulfone and polyhydroxy styrene crosslink under acidic conditions to give films that swell considerably in NMP, in the presence of glycerol however films form with very little swelling.

Another aspect of this disclosure as mention previously is the above the polymeric components of this disclosure may be chosen from the category of preferably relatively oxidant stable homo-polymers polymers of the structures but may also be, co-, tri- and tetra-polymers, block copolymers and graft copolymers. In the case of co-, tri- and tetra-polymers, block copolymers and graft copolymers the ionic portion will be in at least one of the components, wherein the other components may have different compositions with different functions. These different characteristics may be in hydrophilicty/hydrophobicity, reactivity, and crystallinity vs amorphous structures. For example sulfonated polysulfone may be the homopolymer used to make the selective layer, but in another embodiment the sulfonated polysulfone sulfone may be one of the blocks of the block copolymer of polysulfonated-block-polyvinylidene fluoride US application No. 20060047095 and references therein, and European polymer journal 2004 40(3) 531-541 Yang et al and Y Yang et al Macromolecules 2004, 37(5) 1678-1681, which are incorporated herein by reference in their entirety. In this case the PVDF may be used to adjust morphology or be used for crosslinking. Methods for crosslinking polyvinylidene fluoride, sulfonated polyvinylidene fluoride and other fluoropolymers are known, see such as U.S. Pat. Nos. 3,516,791 and 3,840,646, as well as Fluoropolymers, L. A. Wall, ed., High Polymers, Vol. XXV, Interscience 1972, which are incorporated herein by reference in their entirety. polyvinylidene fluoride blocks, oligomers and polymers may be crosslinked with free radical sources such as AIBN, benzoyl peroxides and inorganic free radical sources such a persulfate, and the redox couple of persulfate/sulfite.

Another important consideration in the use of ionomers is the placement of the ionic groups. For example from the US patent application Number 20060036064 (McGrath; James E; et al. "Sulfonated polymer composition for forming fuel cell electrodes", which is incorporated herein by reference in its entirety. Sulfonate polysulfone may be achieved in the following two approached each of which has different implications for the final membrane. Sulfonation of bisphenol poly(arylene ether sulfone) after the polymer is formed places the sulfonic groups on the activated ring of the polymer. Polymerization, however with a sulfonated monomer offers the opportunity of placing the sulfonic group on the deactivated ring. The concentration of sulfonic groups and there placement directly affects membrane properties which in this case the polymer which had been prepared by the polymerization of the sulfonic groups on the deactivated rings gives a membrane with improved conductivity (for FC applications) and better stability over membranes made with polymers sulfonated after polymerization. In one aspect the choice of such polymers, with the sulfonic groups placed on the deactivated rings allows for crosslinking reactions described in the disclosure to take place through the more activated rings.

Aryl amino derivatives of the engineering plastic described in this disclosure may be derivatized from nitro or amino containing polymers. Many methods are known in the state of art. An examples of the procedures used for nitration to nitro derivatives and then reduction of the nitro derivatives to amino derivatized polymers is given in W. H. Daly and S. Lee and C. Rungaroonthailcul "Modification of Condensation Polymers" Chapter 1 in Chemical Reactions on Polymers, ACS Symposium Series 363 (1988), which is incorporated herein by reference in its entirety. These aryl amino derivatives are then used to form diazonium salts which depending upon the pH of the system may undergo by various mechanisms aryl substitution or coupling reactions. Conversion of amino groups to diazonium salts are well known in the state of art. And further conversion of the diazonium salts into aryl —OH groups are also well known.

In one embodiment the ionic membranes comprising at least one component which is a crosslinked polymer network derived from an aromatic hydroxylated (—OH) multi-function monomers, oligomers or polymers. In membrane preparation precursors of the aromatic hydroxylated (—OH) multi-function monomers, oligomers or polymers may be used such as aromatic with at least two amino (—$NH_2$) or esters multi-function monomers, oligomers or polymers which may be converted within the process of membrane preparation into —OH groups by diazotization followed by hydrolysis or instead of amino groups, ester groups which may be hydrolyzed or sulfonic groups which may be converted into —OH groups by base treatment known in the state of art. This process may also be carried out on the polymer prior to its use in the coating formulation.

In still another embodiment the combination of SPPO and hydroxylated polymers may be used together in the same blend with ionic or ionomer polymers which give good initial performance but which cannot be readily crosslinked by themselves under the conditions that SPPO or the hydroxylated polymers can be crosslinked, and that are blended all together to give good results with respect to selectivity and reduced swelling which is needed for life time.

In still another preferred embodiment crosslinking through aryl coupling may be based on the decomposition of diazonium salts under either acid, neutral or basic conditions. Without being bound to a given mechanism this coupling may be through the decomposition of diazonium salts to free radicals and/or azo linkages which give free radicals under neutral or basic conditions or aromatic cations under acidic conditions. The step of aryl coupling apparently occurs after the diazonium derivatives are place in neural to basic pH and left to stand under different conditions which are readily optimized. Depending on the diazonium and aryl moieties present the temperature of reaction may be for example from 0 to 15 C or under ambient conditions or at elevated temperature (for example, 30 to 210 C) for different period of time (such as, 2 minutes to overnight to several days), and in solution or dry.

Thus some of the methods of crosslinking for forming stable ionic membranes, according to some embodiments, include:

a) The use of diazonium salts to achieve aryl coupling—In effect arylation of Aromatic compounds by diazonium salts b) Oxidative coupling of —OH to form aryl ether (—O—) bonds c) Heat curing of aryl or phenolic —OH under acidic conditions.

d) Crosslinking —OH by free radical generation using initiators such, free radical source or initiator such as by way of example persulfate salts alone or in combination with reductants such as metabisufite sulfite or thiosulfate or similar salts or Ce(IV) or maganic salts which are used in grafting of polyvinyl alcohol or Fenton's reagents, or reagents used in oxidative polymerization such as potassium ferricyanide or other catalytic oxidants which can bring about oxidative coupling under various conditions such as aqueous basic conditions (such as, pH 10-13) in the presence of oxygen.

e) Crosslinking of polyvinylidene fluoride polymers or chain segments by free radical sources and monomers undergoing free radical polymerization.

f) The formation of sulfones from polyaromatic sulfonic acid in an electrophilic substitution on an electron rich ring as exemplifies by 2,6-dimethyl polyphenylene oxide (PPO) or sulfonated polyetheretherketones (PEEK).

g) A combination of a to f above.

h) crosslinking of vinylidene fluoride groups by free radical initiators (for example, sodium persulfate).

Types of selective film structures that are covered under the scope of this disclosure, include for example:

1) Anionic charged membranes based on anionic groups preferably sulfonic, and phosphonic, and carboxylic groups.

2) Cationic charged membranes with groups such as quaternary ammonium, sulfonium, phosphonium 3) Membranes which are amphoteric mixtures of anionic and cationic groups 4) Membranes which are mosaic mixtures of anion and cation charged domains.

A) One charge sign is dispersed in a matrix of the other charge sign.

B) Both charges are dispersed in a neutral or significantly less charged matrix of either charge 5) Layers containing alternating net ionic charge as for example a first layer of cationic groups followed by a layer with anionic groups.

The selective ionic film may have ionic capacities that may vary for example between 0.2 or 1.0 or to 1.7 or to 2.0 or to 4.0 charge capacity as a function of the desired selectivity flux relationship and the application.

The importance of amphoteric and mosaic structures lies in the unique selectivity's that can be achieved. For example membranes with high organic rejections but with salt passage both monovalent and divalent or trivalent, ions are possible. In addition the control of divalent vs monovalent salt passage may be achieved by variations of amphoteric or mosaic mixtures (References C. Linder and Ora Kedem "Asymmetric ion exchange mosaic membranes with unique selectivity" Journal of Membrane Science 181 (2001) 39-56, C, which is incorporated by reference herein in its entirety. Linder et al, European Patent Application 0489693 A1 "Charged Asymmetric Mosaic Membranes")

Details of means of crosslinking included in the present disclosure: non-limiting examples:

1) Using $K_3Fe(CN)_6$ in basic solution to crosslink polyaromatic hydroxy compounds in the presence of engineering plastics which may also undergo crosslinking. For example sulfonated polyphenysulfone mixed with polyhydroxystyrene or an hydroxylated engineering plastic, such as hydroxylated polysulfone which can crosslinked with $K_3FeCN_6$ over a range of pH as for example from 5 to 9 or from 9 to 14. Approaches to crosslinking of the hydroxyl groups Kei Saito, Talcahiro, Toru Masuyama and Hiroyuki Nishide "Oxidative polymerization of 2,6dimethylphenol to form Poly(2,6dimethyl-1,4-phenylene oxide) in Water Angew. Chem. Int. Ed. 2004 43 730-733, in the case of oxidative coupling by such agents as potassium ferricyanide ($K_3Fe(CN)_6$), $MnO_2$, [Cu(tmeda)]$Cl_2$, and others under basic conditions, Lyons et al U.S. Pat. No. 3,989,981 "Antioxidants of bisphenolic polymers", all of which are incorporated herein by reference in their entirety.

Methods and reagents for oxidative coupling of hydroxyaromatic compounds are disclosed in Taylor et al., Oxidative Coupling of Phenols (Marcel Dekker, Inc., 1967); in Patai, The Chemistry of the Hydroxyl Group, chapters 10 and 16 (Interscience Publishers, 1971); and in many US patents such as U.S. Pat. No. 4,256,596, which are incorporated herein by reference in their entirety.

2) Sulfonated aromatic engineering plastics with polyhydroxy polymers such as hydroxylated polysulfone or polyether sulfone or polyetheretherketone or polyhydroxystyrene crosslinked under strong acidic conditions at elevated temperature (ex., 110 C for 1 hour—for example. For example sulfonated polyphenysulfone mixed with polyhydroxystyrene or a hydroxylated engineering plastic)

3) Sulfonated aromatic engineering plastics with SPPO and optionally additional amounts of polyhydroxy styrene crosslinked under strong acidic conditions such as pH 1, at elevated temperature (110 C) for 1 hour—for example.

4) The Fenton Reagent: Mixtures of Fe2+ or Fe3+ with $H_2O_2$ in a pH range between 3-5. or other pH ranges such as 5 to 12 or 1 to 3.

5) free radical source or initiator such as by way of example persulfate salts alone or in combination with reductants such as metabisulfite, sulfite or thiosulfate or similar salts or Ce(IV) or maganese salts which are used in grafting hydroxyl containing polymers.

6) Another crosslinking embodiment included in the disclosure is the coupling of aromatic groups through diazonium salts. In one approach this is by a free radical mechanism. In effect aromatic amines groups on the polymers (for example, Amino polysulfone) are converted to diazonium salts under acidic conditions which are then put under basic conditions to ultimately form free radicals which couple to form crosslinks This is based on arylation of aromatic compounds by diazonium salts (See Advanced Organic Mechanisms by J March 3rd addition which is incorporated herein by reference in its entirety). When the normally acidic conditions of a diazonium salt is made alkaline the aryl portion of the diazonium salt can couple with another aromatic ring. In acid solution diazonium salts are ionic and their reactions are polar. When they cleave the product is an aryl cation. However in neutral or basic solutions diazonium ions are converted to covalent compounds, and these cleave to give free radicals. In a second approach the coupling between aromatic groups occurs by the diazonium salts cleave under acidic conditions to form cations and these add to electron rich aromatic rings.

Some non-limiting methods of preparation of hydroxylated engineering plastics such as polysulfone (PSu), polyphenylsulfone (PPS), polyphenylenesulfone, polyethersulfone (PES), polyetherketone (PEEK). Polyetherketoneetherketone (PEKEK), 2,6dimethyl polyphenylene oxide (PPO), polyphenylene sulfide (PPS), and others 1. Nitration, reduction diazotization then hydrolysis as for example in aqueous solutions of sulfuric acid at 50 to 100 C.
2. Lithiation as described by Guiver in U.S. Pat. Nos. 4,598,137, 4,797,457, 4,894,159, which are incorporated herein by reference in their entirety, followed by conversion to hydroxylated polymers.
3. Sulfonation followed by hydrolysis in aqueous alkali. In this method there is a partial formation of hydroxyl groups. The usual method of fusion in caustic may also be used in some cases but generally causes side reactions.
4. Formation of amines conversion to amides, rearrangement to esters and finally hydrolysis to hydroxyl groups.

Another preferred case is the use of sulfonated PVDF polymers or copolymers which may be crosslinked by heating with free radical initiators such as persulfate. Methods for crosslinking polyvinylidene fluoride, sulfonated polyvinylidene fluoride and other fluoro-polymers are known, see such as U.S. Pat. Nos. 3,516,791 and 3,840,646, as well as Fluoropolymers, L. A. Wall, ed., High Polymers, Vol. XXV, Interscience 1972. Sulfonation may be carried out as in Example 1 of U.S. Pat. No. 4,188,354, which are incorporated herein by reference in their entirety.

In addition the ionomers may be mixed with non water swelling polymers but may nevertheless be dissolved in solvent combinations which dissolve both the ionomer polymer and the other polymers in such solvent combinations which do not dissolve the support upon which they are cast. Small amounts of solvents which may dissolve the support in higher concentrations may be added in low concentrations to the other solvents of the coating formulation to enhance solubility of the coating polymers as needed.

To the ionomers or mixtures of such polymers may be added with other polymers such as water soluble polymers chosen from a) polyvinyl alcohol and its copolymers, or b) polyalkylaxazoles, or sulfonated polystyrenes and its copolymers and the like. Some of these water soluble polymers may undergo crosslinking, and others may be used as viscosity enhances and modifiers of the selective films morphology and thus modifiers of flux and selectivity properties.

The synthesis of the polymers having functional groups of —$SO_3H$, —POOH, —COOH, —OH. In one preferred embodiment, the sulfonated polyether ketones U.S. Pat. No. 6,632,847 Soczka-Guth, et al. is included in the disclosures as per the material and the methods of synthesis and processes describe therein. In particular, there is provided, according to some embodiments, polyether ketone polymers backbone structure, sulfonated polyether ketones having the repeat unit —O—Ar—CO—Ar—with an IEC of about 1.3 to 4.0 meq (—$SO_3H$)/g of polymer. In some embodiments, they formed sulfonated aromatic polyether ketone which has an ion-exchange capacity of from 1.3 to 4.0 meq (—$SO_3H$)/g of polymer. Sulfonated, strictly alternating polyether ketones with the repeat unit —O—Ar—CO—Ar— are described in J. Polym. Sci.: Vol. 23, 2205-2222, 1985 and were synthesized in this case by electrophilic attack, and not nucleophilic attack described in EP-A-0152161, all of which are incorporated herein by reference in their entirety. The polymers were sulfonated by sulfur trioxide using triethyl phosphate in dichloroethane. Membranes made from sulfonated polymers from the strictly alternating polyether ketones with the repeat unit —O—Ar—CO—Ar— were found to be more stable in boiling water (such as for 50 hrs) as compared to membranes made from sulfonated PEEK of comparable ion exchange capacity (IEC of at least 1.5 meq (—SO3H)/g) based on Victrex 450 PF are stable for only from about 2 to 3 hours in boiling water.

There are different methods known in the state of art to introduce sulfonic groups into aromatic polymers. Polyarylenes, polyaryl polymers (for example, polysulfone (PSu), polyphenylsulfone (PPS) and polyetheretherketone (PEEK) through concentrated sulfuric acid, fuming sulfuric acid, chlorosulfonic acid, sulfuric anhydride or a sulfuric anhydride triethylphosphate chlorosulfonic acid, sulfuric acid, sulfur trioxide and sulfur trioxide complexes, sulfonyl chloride and various other reagents. According to some embodiments, these methods and resulting polymers are included under the scope of the present disclosure. Examples of these procedures and polymers which are included under the scope of this disclosure are, for example, U.S. Pat. No. 5,348,569 Bikson Chlorosulfonation of Sulfonation of PPO, U.S. Pat. No. 6,632,847 Soczka-Guth, et al. Formed sulfonated aromatic polyether ketone, U.S. Pat. No. 4,504,852 Bikson et al Compositions and method of preparation by chlorosulfonation of difficultly sulfonatable poly(ether sulfone), U.S. Pat. No. 5,348,569 Bikson et al Modified poly(phenylene oxide) based membranes for enhanced fluid separation, U.S. Pat. No. 5,364,454 Bikson Nov. 15 1994 Fluid separation composite membranes prepared from sulfonated aromatic polymers in lithium salt form U.S. Pat. No. 5,071,448 Bikson, Semipermeable membranes based on certain sulfonated substituted polysulfone polymers, U.S. Pat. No. 4,508,852 Bikson et al Compositions and method of preparation by chlorosulfonation of difficultly sulfonatable poly(ether sulfone), Cabasso et al U.S. Pat. No. 6,103,414 Blend membranes based on sulfonated poly(phenylene oxide) for polymer electrochemical cells, U.S. Pat. No. 5,128,378 Sugaya (Crosslinking of sulfonated polymers which also contain —SH and chloromethylated groups), Methods of sulfonation: U.S. Pat. Nos. 4,413,106, 5,013,765, 4,273,903 and 5,438,082, and Linkous, et al., J. Polym. Sci., Vol. 86: 1197-1199 (1998) all of which are incorporated herein by reference in their entirety.

Counterions for the anionic groups may be hydrogen ion, a metal cation, preferably Li.+m, Na.+, K.+, Rb.+, Cs.+, NH4+, or an optionally alkylated ammonium ion, appropriately for hydrogen or Li.+, in particular for hydrogen. Some preferred polymers are 1) polysulfone PSu Udel® and PSU P 1800 (Amoco).

Lithiation from which many derivatives may be derived (see Guiver et al such as U.S. Pat. Nos. 4,598,137, 4,797,457, 4,894,159, which are incorporated herein by reference in their entirety. First of all PSU Udel® was dissolved in dry THF and the solution was cooled to −75.degree. C. under argon. Traces of water in the reaction mixture were removed with 2.5 M n-butyllithium (n-BuLi). The dissolved polymer was subsequently lithiated with 10 M n-BuLi. The batch was left to react for one the and then pyridine-3-aldehyde or 4,4'-bis(N, N-diethylamino)benzo-phenone was added. The reaction temperature was thereafter raised to −20.degree. C. for one hour.

In one embodiment, of this disclosure amphoteric or mosaic blends of anionic and cationic polymers are made to achieve different selectivity's than what is possible with selective barriers of only one charge. Different approaches to making quarternized derivatives of condensation engineering plastics to form quarternized ionomers is given in U.S. Pat. No. 5,028,337 (Linder et al). For example Bromination of poly(2,6-dimethyl)phenylene oxide and subsequent quaternization of bromomethylated poly(2,6-dimethyl)phenylene oxide or chloromethylation of a polysulfone followed by quaternization of chloromethylated polyethersulfone. These methods and other methods for forming quaternary ammonium, sulfonium and phosphonium are well document in the state of art and are incorporated herein by reference (by way of examples, U.S. Pat. Nos. 4,839,203 and 4,797,187, to Davis et al, which are incorporated herein by reference in their entirety).

In one embodiment the disclosure is a material combination and a process to form thin film coatings of less than 2 microns and preferably submicron on a porous support which in one preferred embodiment is a asymmetric UF support which the thin films have ion exchange capacities from 0.5 to 3.5 meq/gr, and preferably 1.0 to 2.5 meq/gr, crosslinked within at least one component with controlled swelling which gives relatively stable flux and rejection which the instability would have occurred by uncontrolled swelling.

The range of thickness of thin selective barriers (may also be referred to as a "Thin layer") on the support (such as the selective surface of a UF or a MF membrane) that can be formed as disclosed herein may range between 5 nm to 5000 nm and preferably in some embodiments from 20 nm to 500 nm, such as between 100-200 nm, or between 30 nm to 200 nm In a second embodiment the membrane may be a membrane of microns to mm in thickness which is self supporting or/and mechanically reinforced with netting mesh or particles dispersed within. The dispersed particles may have only the role of improving mechanical stability but may also play the role of improving conductance, and or selectivity.

The process of forming the membrane in one embodiment comprises

1. Formation of a polymer solution containing some or all of the components of the selective film in a solvent or solvent mixture which will not dissolve the support upon which the composite is formed. For example many ionomers and other components may be dissolved for example in an alcohol water mixture such as ethanol/water.
2. Application to skin face of an organic asymmetric UF membrane formed for example by the process of phase inversion of an engineering plastic or mixture of plastics material the solution prepared in "1" above of the ionomeric polymers to form a wet film on the surface of the support, the application to the surface may be under atmospheric pressure by well known coating methods such as Gruever, kiss coating, immersion coating, or under a higher pressure than 1 atm, applied to the coated surface or vacuum applied from the opposite side to which the solution is applied.
3. Drying the applied solution, and subsequently or simultaneously curing or at least one heat treatment or/and at least one chemical treatment(s) of the membrane from step 2.
4. Optional post-treatment of the applied membrane are by acid, bases and or/and oxidants Or/and further heat curing optionally under pressure, under vacuum, nitrogen, rare gases, and others which may be used to achieve crosslinking reactions between the all, or/and some of the components of the coated films. In one example the thin layer is applied to the support in one pH in order to achieve an optimum morphology for flux and rejection. After this layer is deposited a second solution is applied at a different pH or with other components optimal for crosslinking in a subsequent step.

The solution of the ionomeric polymers is essential achieving the desired membrane. The solvents or solvent combination should dissolve the polymer(s), and at the same time not be solvents for the supports. The solvent may be essential one solvent or mixtures of solvent. One preferred solvent combination are the low alkyl alcohols such as methanol, ethanol, isopropyl and propyl alcohol with water. Especially preferred in some cases are mixtures of ethanol and water where in the ethanol is at least 50% of the ethanol water mixture and often preferable greater up to 95 or 98%. These solvent combinations are often preferred as they are relatively environmentally friendly as compared to other solvents. Other solvent combinations useful for this disclosure can be taken from U.S. Pat. No. 4,990,252 Tomaschke; J. E.; Testa; A. J.; Vouros; J G. "Stable membranes from sulfonated polyarylethers", which are incorporated herein by reference in their entirety, which are incorporated herein by reference in their entirety). The solvent and solvent combinations described in the above mentioned references are included as embodiments of this disclosure. The solvents used for dissolving ionomers may also be used to dissolve the ionomer with other components. Examples of other solvent components that may be used are tetrahydrofuran (THF), acetonitrile(ACN), acetone, 2-methoxy and ethoxy ethylene glycols.

Small amounts of solvents which may dissolve the support (such as, DMF, NMP, and others) in higher concentrations may be added in low concentrations to the other solvents of the coating formulation to enhance solubility of the coating polymers as needed.

A preferred combination is that of lower molecular weight alcohols and water where the ratio is in general (but not in all cases) more in the direction of a higher concentration of the alcohol component to water. Depending on the polymers a typical combination is 60/40 ethanol/water, up to 95/5. Typical polymer concentrations in the solvent depends on the mode of application to the support. In the pressure or vacuum mode of application concentration is less than 1% and closer to 0.1% or 0.05%. For the other modes of coating described above the polymer concentrations may go as high as 10% to 15%, but generally between 1 to 5%. Other solvent combinations are acetone/water (such as, 75%/25%), and acetonitrile/water (such as, 95%/5%), and other aqueous mixtures with tetrahydrofuran (THF), acetonitrile(ACN), acetone, 2-methoxy and ethoxy ethylene glycols, and others Another useful solvent for the sulfonated polymers alone or in combination with other solvents is formic acid at a concentration from 5% to 100% formic acid, with other solvents or flux enhancing additives. Other solvents together formic acid are formamide and formamide-containing mixtures such as formamide/2-methoxyethanol and formamide/formic acid. Acetone and acetonitrile can be used with other as for example mixtures of acetonitrile/water and acetone/water.

In the polymer solutions that are used to coat the supports other components may be present in the coating solution to facilitate the coating process such as surfactants to help wet the support if necessary, and agents which prevent collapse of the UF support during the curing and/or drying step of the process. One preferred agent is glycerol. Typical concentrations of glycerol in the coating formulation may vary from 1 to 40% and in one preferred embodiment between 10 to 25%. Residual amounts of glycerol and glycerol like solvents, may also be used to enhance reaction kinetics of the crosslinking step, and/or modify morphology, and/or participate in the crosslinking reaction.

In one embodiment the curing and/or heating step of the deposited membrane is an important component of the disclosed membranes. Different curing times and temperatures will give different membrane performance. In addition depending on the chemistry involved in the crosslinking step different curing temperatures are needed. There is also a time temperature superposition principle. In effect the higher temperatures need shorter times. For example for the case of making membranes based on thin films of sulfonated polyphenylsulfone (SPPS) a typical drying schedule is 1 hour at 110 C with an initial casting solution of pH 1. This typically will give membranes with rejections between 85% to 95% to sucrose with fluxes of 2 to 7 Lp. Higher temperatures (120 C) for the same time period will give a higher rejection range and lower flux range. However shorter times at these higher temperature will give similar performance. Longer times than 1 hour will also give high rejections and lower fluxes. Thus By adjusting the curing temperature and times and pH of the initial casting solution, and the nature of the counter ion membranes with different fluxes and rejections can be achieved. It was also surprisingly found that the presence of glycerol and similar solvent molecules facilitates the crosslinking or insolubilization reactions of the ionic polymer films, membranes or coatings. In addition the use of glycerol in the presence of hydroxylated aromatic oligomers and polymers give even more enhanced stabilization, or crosslinking or insolubilization of the ionomer. Thus using this later combination curing times may be lowered below 1 hour and/or the curing temperatures may be lowered or both curing times and temperatures may be lowered.

In the case of crosslinking through oxidation coupling or diazonium reactions temperatures below 100 C and room temperature and even lower may be used as well as above 100 C.

A mode of coating the solution of components making up in part the selective barrier is by applying a thin layer onto the dense surface of the asymmetric UF support by coating solutions from 0.1 to 10% polymer on porous supports (such as, tight upper surface of a asymmetric UF support) by methods such as gravure, dip, reverse roll, gap, metering, extrusion, curtain, or air knife coating, followed by solvent evaporation.

Another preferred mode of application is by pressure of up to 20 bars [A typical pressure applied is from 1 to 15 bars, and in one embodiments form 4 to 10 bars] or by the application of a vacuum. The vacuum may be applied by a water aspirator, oil vacuum pump or a diaphragm vacuum pump. The amount of solvent collect in the permeate during concentration by pressure or vacuum application of the polymer solution used will determine the extent of material collected on the surface of the membrane. The density of the film applied to the surface may depend on the magnitude of pressure or vacuum applied. In many applications thin dense films are preferred to open thick films. Also the application of pressure can affect the morphology of the final film. In this approach of pressure or vacuum dilute solutions (such as, 0.001 to 1% preferably 0.01 to 0.5%) are used of a polymer coating solution. One of the benefits of working with dilute solutions is the possibility of using polymers that will not dissolve at higher concentrations and the use of polymer mixtures such as ionic polymers of opposite charge in forming amphoteric and mosaic structures without precipitation. Another benefit is the economic use of expensive components of the selective barrier.

In addition to forming single layers of the selective barrier on the support, this disclosure also includes multilayer formation. One layer is first laid down followed with one or more additional layers may be deposited. The layers may be made of the same composition or different compositions and may be deposited or coated in the same or different methods. They also may be coated from similar solvent combinations, concentrations and/or pH or different solvents concentrations and/or pH. In addition between applying each layer the prior layer may or may not be crosslinked or cured. In one preferred embodiment the second layer is either deposited so it does not disturb the first layer either because of a different composition that can use a different solvent which does not disturb the first layer, or/and the first layer has been stabilized. And or the method of application is under pressure or vacuum such that the first layer is held in place by the vacuum or pressure. The multiple coating approach may be used for various reasons. In one scenario an additional layer is applied to repair imperfections and to plug holes. In a second reason the applications of layers of different ionic sign in order to achieve alternating layers of positive and negative charge and thus change the selectivity of the selective film. In another reason an additional layer during the coating may be added to improve rejection or as an anti fouling layer, or additional coating without polymers may be applied to change the reaction conditions (pH, residual solvent, counter ions of the ionic groups, of the first layer prior to a subsequent curing step, and or morphological change of the previous coating(s)

In all the above cases of applying the thin film a minimal amount of penetration of the polymer components into the pore is often preferred so as to achieve a high flux. There may be however some penetration for stabilizing the structures and in some cases this penetration may affect final membrane selectivity. Optionally the composite may contain an intermediate layer between the top ionic (such as, sulfonated) selective film and the porous support, or the selective layer sandwiched between two different layers or a combination of both and multiple layers of the aforementioned combination or other combinations. In one method of preparation of the disclosed composite the support is first impregnated with a pore protector prior to coating the polymer to prevent excessive penetration of the coating polymer into the support. Depending on the pore protector it may be removed after the coating is in place or it may be permanently fixed in the pores if it does not reduce the overall flux to unacceptable low levels as per the application. Another preferred method of preparation may use no pore protector, and a combination of support pore size, polymer molecular weight and the method of application are used to control the degree of pore penetration. For adhesion and fixing of the coating on to the support some penetration of the polymeric coating into the upper pores of the support may be desirable. In one preferred embodiment of this disclosure the coating may be covalently chemically bonded to the support, as in the case of using diazonium reactions to affect the crosslinking.

The polymer which may be used for making the UF support are especially those made from condensation polymerization and/or engineering plastics with a combination of acid/base and oxidant stability and in some cases solvent stability. Typical polymers of which the UF support may be made from are selected from polysulfone (PSU or PSu)), polyimide (PI), polyphenylene oxide (PPO), polyphenylene sulfoxide (PPSO), polyphenylene sulfide (PPS), polyphenylene sulfide sulfone (PPS/SO$_2$), polyparaphenylene (PPP), polyphenylquinoxaline (PPQ), polyarylketone (PK) and polyetherketone (PEK) polymer. polyethersulfone (PES), polyetherethersulfone (PEES), polyarylethersulfone (PAS), polyphenylsulfone (PPSU) and polyphenylenesulfone (PPSO$_2$) polymer; the polyimide (PI) polymer comprises a polyetherimide (PEI) polymer; the polyetherketone (PEK) polymer comprises at least one of a polyetherketone (PEK), polyetheretherketone (PEEK), polyetherketone-ketone (PEKK), polyetheretherketone-ketone (PEEKK) and polyetherketoneetherketone-ketone (PEKEKK) polymer; and the polyphenylene oxide (PPO) polymer comprises a 2,6-diphenyl PPO or 2,6dimethyl PPO polymer. Preferred polyetherketone polymers include polyetherketone (PEK), polyetheretherketone (PEEK), polyetherketone-ketone (PEKK), polyetheretherketone-ketone (PEEKK) and polyetherketoneetherketone-ketone (PEKEKK) polymers. However, in most cases the preferred substrate materials are polysulfones, polyethersulfones and polyphenyl or polyphenylene sulfones or polyvinylidene fluoride or a aromatic carbonyl condensate polymaer such as PEEK. These polymers are availability from numerous suppliers such as Solvay, ICI, BASF. For example from Solvay UDEL™ polysulfone, RADEL™ A polyether sulfone and RADEL™ R polyphenylsulfone as well as SOLEF™ fluoropolymer such as Kynar grade 460.

"U.C.P. 1700" by Union Carbide. Solvay advanced polymer for membranes UDEL P-3500 LCD, a low cyclic dimer polysulfone, Acudel TM polyphenylsulfone blends, MINDEL TM modified polysulfones poly(ether sulfone) having the formula (I) described above (Victrex; PES-100P; Imperial Chemical Industries, Ltd., England, polyetheretherketone (PEEK, available from Hoechst AG, Frankfurt, Germany Other polymer for forming the UF support may also be chosen from fluorinated polymers though they do not have the same base stability as many of the aforementioned engineering plastics in certain applications they may be preferred with respect for example to mechanical/physical properties. Such polymers may be chosen from: polyvinylidene fluororide (PVDF), polyteterafluoroethylene(PTFE), poly hexafluoropropylene(PHFP), polychlorotrifluoroethylene(PCTF), and co and tripolymers of the above such as PVDF-co-PTFE, PVDF-co-PTFE, PVDF-co-PHFP, PVDF-co-PCTF Poly (perfluoro dioxoles) as a homopolymer and copolymers with other fluorinated monomers such as vinylidene fluoride or tetra-fluoro ethylene. Also included are selective membranes based on partially fluorinated polymers alpha substituted and non-substituted tri-fluorinated polystyrenes. polysulfides; poly(vinyl chloride), For solvent stable membranes derived from polyacrylonitrile (as for example in Linder et al U.S. Pat. No. 5,039,421) which have been modified chemically to give solvent stable UF membranes, and crosslinked polysulfone (U.S. Pat. No. 5,028,337 and others) and polyimide derived membranes.

Methods of making UF membranes and UF membranes as supports for composites are well known in the state of art and are included within this disclosure. The UF support of this disclosure is a porous support formed from organic polymers by any of the well known state of art processes. For casting procedures non-limiting reference may be made to U.S. Pat. No. 4,029,582, GB 2,000,720, Office of Saline Water R & D Progress Report No. 359, U.S. Pat. Nos. 3,556,305, 3,615,024, 3,567,810, and "Reverse Osmosis and Synthetic Membranes" Ed. Sourirajan, which are incorporated herein by reference in their entirety, as well as many other references. Thus, for example, the polymer may be dissolved in a suitable solvent (or mixture of solvents), such as NMP, DMF, DMSO, hexamethylphosphoramide, N,N-dimethylacetamide or dioxan (or any of these containing additives such as cosolvents, partial solvents, non-solvents, salts, surfactants or electrolytes pore forming polymers, viscosity enhancers, and others. The casting solutions may then be cast on a support material such as glass, metal, paper or plastic, from which it may be removed. It is preferred for many applications, however, to cast the solution onto a porous support material from which the membrane is not removed. Such porous support materials may be woven or nonwoven textile materials such as those made from cellulosics, polyethylene, polypropylene, nylon, vinyl chloride homopolymers and copolymers, polystyrene, polyesters such as polyethylene terephthalate, polyvinylidene fluoride, polytetrafluoroethylene, polyether-ketones, glass fibers, porous ceramics and inorganics. The UF support may be also cast on expanded polyolefin microporous membranes.

The disclosed membranes may be made by forming the selective layer on different support configurations such as flat, capillary, tublets or hollow fiber configuration, and then used as is or be configured into configurations such as a plate and frame, spiral wound, tubular or hollow fiber elements. In another embodiment of the disclosure the coating may be applied to the support inside a finished plate and frame, spiral wound, tubular or hollow fiber element. Those skilled in the art are aware of the many methods for forming a porous substrate into different configurations.

Hollow Fiber or Capillary Membrane Configuration. In another embodiment of the present disclosure, hollow fiber membranes are made from polysulfones, polyether sulfones, polyether ketones, polyvinylidene fluoride, sulfonated polyvinylidene fluoride or polyacrylonitrile.

Tubular Membranes

Alternatively, a hollow support tube of polyester or polyolefin or many other polymer of about 0.5 to 2 cm in diameter may be used to form tubular membranes. All the above methods may be used to form membranes for further modification (coating) as described by the present disclosure.

In addition to microporous supports that can also be used in this disclosure:

Polymeric or inorganic or ceramic microporous and UF membranes with pore size varying from 0.0.002 to 10 microns can also be used in this disclosure. These supports may be made by way a variety of techniques well known in the art U.S. Pat. No. 4,466,931, Ind. Eng., Prod. Res. Develop., Vol. 13, No. 1, 1974, U.S. Pat. No. 3,812,224 and Castro, U.S. Pat. No. 4,247,498, which are incorporated herein by reference in their entirety. The materials commonly used for malting microfilters are: polysulfones, polypropylene, polytetrafluoroethylene, alumina, silica, carbon, polyvinylidene fluoride, high and low density polyethylene, polypropylene, polystyrene, polyvinyl chloride and oxidation polymers such as polyphenyleneoxide.

Treatment of Support Prior to Coating:

In one preferred embodiment the UF support is coated to form the composite with a minimal pretreatment step such as treatment such as washing of the support with water of acid and/or basic pH streams or with cleaning agents followed by a subsequent washing step, with an optional step of washing with surfactants and then a an optional final rinse prior to coating. These agents are well known in the art and include the non-limiting examples of sodium dodecyl sulfonic acid or sodium lauryl sulfate or Triton X-100, or solvents such as butyl alcohol/water mixtures. As mentioned above in some embodiments the porous support may contain groups which enhance the adsorption or stability of the coating polymer to the support. The porous support may also be treated with a pore protector which minimizes excessive penetration of the coating polymer into the support which could reduce the final flux of the composite membrane to unacceptable low values for a given application. The pore protector may be washed out after the composite is formed or it may be kept in place if the flux of the final combination is high enough for the application. Examples of pore protectors are hydrophilic polymers, water soluble or water swellable, and thermal gels such as gelatin which may be applied in the sol state and then gelled and removed by heating and washing out under pressure.

In one preferred embodiment, the polymeric UF membrane is made with additives added to the casting solution of the UF support to enhance the adhesion of the ionomer to the UF support. Such additives may be organic or inorganic. If the coating is an ionic polymer or ionomer such as by way of example perfluorinated ionomer or a sulfonated engineering polymer such as polysulfone, polyethersulfone, polyphenylsulfones, polyphenylene sulfones, polyetheretherketone, polyetherketone or mixtures of such polymers the additive will have some attraction to the ionic groups. In one preferred embodiment the additives are zirconium oxide, aluminum oxide and similar inorganics which are known to have interaction with anionic groups such as sulfonic groups. Polymeric additives such as polyvinylpyrollidinone (PVP), which complex with anionic polymers may also be used as additives in the preparation of the UF support. Alternative after the UF support is formed it may be subjected to reactions well known in the state of art which introduce groups which would enhance the adsorption of the ionomer unto the UF support. Such groups are amino groups, or cationic groups such as quaternary ammonium or sulfoniums or phosphonium groups. In one preferred mode the amino groups may be added by the process of nitration and reduction or by graft polymerization of monomers which contain anionic interactive groups such as vinylpyrollidinone or triallylamine or diallyamine or vinyl formamide which may then be reduced to amino groups.

Compatibilizers may also be employed in producing composite membranes of the present disclosure. As used herein, "compatibilizers" refer to agents that aid in the blendability of two or more polymers that would otherwise be resistant to such blending. Examples include block copolymers containing connecting segments of each component. These include both potential substrate and/or ion-conducting polymer components.

Pore size considerations: While supports as for example asymmetric UF supports all pore sizes can be modified but there is an optimum pore size and pore density that will give the optimum performance of the final composite after the UF support is coated and cured or otherwise treated. The optimum relationship between the support characteristics and the final composite performance can be determined readily by trial and error.

The post treatments described in U.S. Pat. No. 4,990,252, which is incorporated herein by reference in its entirety, may be used as needed as an optional refinement to achieve a required performance. In effect "Optional post treatments consisting of organic solvents and aqueous mixtures with or without thermal treatments can be given to the finished composite membrane for the purpose of improving permeability through swelling and/or hydration of the thin film. The post treatment may alternatively include further stabilization or "tightening" of the thin film polymer through ionic crosslinking or salt formation using solutions of multivalent metal salts, or through basic nitrogen containing compounds. Thermal treatments in aqueous media may be applied for the purpose of reordering the permselective barrier and thus further affecting membrane transport behavior."

A non-limiting commercial flat sheet of a UF support used in the following examples was PW membrane (GE Osmonic's P-series PES ultrafiltration membrane with a MWCO of 10,000, Rej to cytochrme C>96%. Many other commercial UF membranes may also be used, such as UF membranes supplied by Hoechst, and many other companies.

In general the method of converting engineering polymer into ionomers by for example sulfonation is well known and described in the references given above. Non-limiting example: Polyphenylsulfone (Aldrich-Sigma catalog No 42, 831-0) was sulfonated by drying a given amounts (grams) overnight at 100 C, cooled and then dissolved in chloroform. The solution was cooled to −10 C and to then chlorosulfonic acid was added and the solution stirred under N2 at 0 to 4 C for 60 minutes. The solution was precipitated in an ethanol/water solution, washed with DI water and then an equivalent amount of lithium hydroxide to obtained the Li salt of the sulfonated polyphenylsulfone and dried in a vacuum oven overnight.

Sulfonated 2,6-dimethyl polyphenylene oxide (SPPO) was prepared from commercial-grade poly(phenylene oxide) from General Electric Company. The polymer was purified and sulfonated according to procedures in Examples 1 and 2 in U.S. Pat. No. 5,364,454 (Bikson et al), which is incorporated herein by reference in its entirety.

Preparation of Sulfonated Polyetheretherketone (PEEK-$SO_3H$): A series of solutions were made by adding 30 g of polyetheretherketone (PEEK, available from Hoechst AG, Frankfurt, Germany) and 400 mL of concentrated sulfuric acid (100-102%) to 500 mL Telflon-Sealed glass bottles. The bottles were sealed and shaken at room temperature on a mechanical shaker for various times between 10 and 190 hours, with the degree of sulfonation increasing with time. The resulting viscous red solutions were then poured into 4 L of a stirred mixture of ice and water. The precipitates were collected, crushed into fine powder and washed with water until the washings were pH-neutral. The white polymer powders were then dried in vacuum (0.1 torr) at 40.degree. C. for 24 h. The solubility in alcohol and hot water increases with an increasing degree of sulfonation. Water absorption capacity of these membranes ranges from 40% to 5000%, increasing with degree of sulfonation.

In the following examples one mode of characterizing the membranes is as follows. The separation effect (rejection) of the membranes can be measured as follows. A circular membrane with a surface area of 13 $cm^2$, resting on a sintered stainless steel disc, is used in a cylindrical cell made of stainless steel. 150 ml. of the solution (to be tested) which contains the solute to be tested in a concentration $C^1$ (g. solute/g. solution) are introduced onto the membrane in the steel cylinder and subjected to a pressure ($N_2$) of 5 to 20 bars. The solution is stirred magnetically. The concentration ($C_2$) of the liquid which collects on the outlet side of the membrane is determined, 3 samples of 5 ml. each being taken from the start of the experiment. In general, the amount which flows through the membrane and the composition of the 3 samples are constant. The rejection (R) can be calculated from the values obtained using the equation:

$$R(\%) = (C^1 - C^2) \times 0.100 / C^1.$$

The amount of material (F=flux) passing through the membrane per surface and time unit is determined from the equation:

$$F = V \times S^{-1} \times t^{-1}$$

where V=volume, S=membrane surface area and t=time. F may be expressed in terms of liters of solution per square meter surface area of membrane per hthe per bar (Lp). In addition to measurements on flat membranes in the above pressure cells flay membranes were also tested in flow cells and in capillary. Modified Capillaries are checked as capillaries in a small element of known active area Tubular membranes 60 cm. long and with an outer diameter of 1.4 cm. were also checked. For this purpose the tubular membranes were placed in a perforated tube made of stainless steel. The whole is then placed in a tube made of polycarbonate. The outflow from the membrane is between this outer polycarbonate tube and the steel tube. The liquid is added as a stream of solution in turbulent or laminar flow under pressure. The flow rate is kept constant at 10-15 liters per minute. The rejection (R) and the flux (F) are calculated in a similar manner as before.

By way of example the membranes were checked in the above configurations at 15-20 atm with the following solutes: sucrose (5%), 20 mM NaCl, 8 mM $CaCl_2$ and 8 mM sodium sulfate and different mixtures of these solutes.

EXAMPLES

In the following examples a test for crosslinking is carried out on a self standing membranes of 10 to 20 microns in thickness. The test is to place the film in a strong solvent for the polymers, such as N-methylpyrrolidinone (NMP), and the results observed if they dissolve or swell, and the extend of swelling.

The NF membranes prepared as described in the examples below comprise a UF support coated by a polymer layer on the dense selective surface of the UF.

In part of the examples the support was a flat sheet asymmetric UF, PW membrane, GE-Osmonic's P-series PES ultrafiltration membrane with a MWCO of 10,000, Rejection to cytochrome C>96%. This membrane is referred to as the "Osmonics UF" membrane or just the UF membrane. In other cases the UF membrane was prepared by procedures detailed there.

Three procedures were used for the coating:

1) Immersion coating. The UF membrane was immersed in the polymer solution, withdrawn from the solution and dried on a glass plate with the dense side of the UF facing up. Only the coating on the dense side of the UF asymmetric support remains intact when placed face up in the pressure cell, and the bottom coating is washed away.

2) Vacuum filtration: The polymer solution was filtered through the UF membrane by a vacuum applied on the porous side of the UF membrane by a piston vacuum pump.

3) Pressure filtration: The UF membrane was put into a pressure cell and the polymer solution was filtered through the UF membrane by applied pressure.

Example 1a

Sulfonated polyphenysulfone (SPPS) with 1.5 meq/gr sulfonic groups in the lithium form was prepared as described in the above references and dissolved in 20 ml of ethanol/water (60/40) to form a 1% solution and the solution adjusted to pH 1.0 with sulfuric acid and enough glycerol added to make a 20% solution of glycerol. A thin, submicron, film was formed on a flat 20 cm2 piece of the Osmonics UF membrane by immersion coating. After 30 minutes of immersion the film was removed and dried at room temperature for 2 hours before being put into a oven at 11° C. for 60 minutes. The membrane was then placed in a pressure cell with the side of the composite with the thin film coated on the selective side of the UF support. The resulting membrane had a flux of 6.50 Lp (liters/m2/hr-bar) and a 94% rejection to sucrose and 70% rejection to 1000 ppm NaCl.

A non-supported 10 micron thick film of the SPPS solution, but in this case the polymer concentration was 5% and the solvent was prepared and heat treated in the same way. The resultant film did not redissolve in the original solution from which it was cast. If the crosslinked film was placed in a stronger solvent such as NMP is still did not dissolve, but swelled considerably. When the films are refluxed in methanol sodium hydroxide mixtures or placed in pH 12 to 13 at 50 C for more than 48 hrs they still remain insoluble in NMP The membrane made above was placed in the following solutions to check stability:

pH 11-12 for 14 days at room temperature.
pH 1-2 for 14 days at room temperature
20-30 ppm NaOCl pH 10 for 14 days at room
In all solutions the membrane performance remained stable

Example 1b

The UF support was coated with a wet film of a given wet film thickness by fixing it flat on a glass plate and then with a wire coater place on the surface a 1% solution described in 1a at a wet film thickness of 20 microns and letting it dry at ambient conditions. It is then placed in the oven as described in 1a. The resulting membrane had similar performance properties as in

Example 1c

A UF membrane was prepared by dissolving 20 grams of polyether sulfone 5003 from Imperial Chemical Industries (ICI). In 80 grams of a solvent combination composed of 60 grams N-Methylpyrrolidinone and 20 grams of formamide. After stirring for 4 hours at 60 C the solution is left to stand for overnight and then coated onto a polyolefin Awa non-woven Fabric, a 200 micron wet film, immersing immediately in ice water and after 1 hr removing and leaching the remaining solvent in running water for overnight at ambient conditions.

After leaching for overnight in water at ambient conditions the UF support is coated as in example 1a giving a membrane with similar results. Rejection to sucrose 97%; Lp: 4.6 LMH/bar. The Lp of the UF support was 37. The same membrane performance could be achieved without the use of 20% glycerol in the coating solution. Glycerol prevents compaction and tightening of the UF structure which can result in a very low flux membrane.

Example 1d

In this example the selective SPPS layer is prepared by vacuum filtration. After the solution was passed though to make a calculated dry membrane thickness of 200 nm on the UF membrane (104 m2). The membrane was placed in a oven at 110 C for 1.0 h the and gave similar results to what was observed in example 1a. Similar results were also observed if the coating solution was applied by pressure filtration at 20 atms.

Example 2a

A mixture of SPPS/Polystyrene hydroxyl PStyOH (80/20) was dissolved in the solvent described in example 1a, at total polymer concentration 0.02%. of total polymer of the combination described in example 1a, adjusted to pH 1 with sulfuric acid and 50 ml was applied to the surface of the UF membrane (104 cm2 area) under vacuum After the solution was passed though to make a calculated dry membrane thickness of 200 nm on the UF membrane, it was placed in a oven at 110 C for 1 hour. Performance: 93% rejection to sucrose, 88-% to NaCl. 70% to $CaCl_2$ and 96% to sodium sulfate, Lp of 1.5.

Self standing films of SPPS/PStyOH made without glycerol gave films which are insoluble in either the original solvents or NMP but swell considerably in the latter. If glycerol was used in the formulation then the self standing film swells very little. The combination of SPPS/PStyOH/Glycerol gives more efficiently crosslinked films then SPPS/glycerol or SPPS/PStyOH.

The membrane made above was placed in the following solutions to check stability:
pH 11-12 for 14 days at room temperature.
pH 1-2 for 14 days at room temperature
20-30 ppm NaOCl pH 10 for 14 days at room
In all solution the membrane performance remained stable.

Example 2b

This example demonstrates that the flux and rejection properties of final membrane can be controlled by to a certain extend by changes in the pH of the coating solution vs the pH is the deposited film during coating. In this example the coating is deposited at pH 7 to form a given morphology and then the deposited film's pH changed to 1 before curing. Thus example 2a is repeated except that the pH of the coating solution is adjusted to pH 7 and the 200 nm thick film is deposited on the support. After most of the solvent has been pulled through and while still under vacuum an additional amount of a solvent mixture of water with 20% glycerol adjusted to pH 1 with sulfuric acid was pulled through the membrane to adjust the pH of the coating to pH 1. After pulling the solvent through the membrane was removed and heat cured as in example 2a. This membrane had a rejection to 20 mM NaCl of 90%, and to 5% sucrose 96% with a Lp flux of 4.2. Thus both the flux and rejections increased significantly over that from example 2a.

Example 2c

This example is like example 2a but with the difference that the relative quantity of SPPS and PStyOH are changed and final NF membrane characteristics are somewhat different. Thus by changing the relative concentration of the thin film components different membranes can be made. In this case a open RO membrane or a tight NF was formed by using this combination and relative concentrations of each component. Selective RO/NF membrane which is a combination of SPPS and PStyOH (polyhydroxystryrene)

A 0.02% of total polymer of the combination described in example 4 but with SPPS/PHSTY (90/10) in a ethanol/water (60/40) mixture with 20% glycerol was made up and 50 ml was applied to the surface of the UF membrane (104 cm2 area) used in Example 1 but under vacuum of a piston vacuum pump. After the solution was passed though to make a calculated dry membrane thickness of 200 nm on the UF membrane that was then removed and placed in a oven at 110 C for 1.0 hour and gave a 98% rejection to sucrose, 93-% to NaCl. 81% to CaCl2 and 97% to sodium sulfate, Lp of 3.2.

Example 2d

When the above membrane formulation used to make the composite membrane in example 2c was made into a self standing membrane which was cured at 110 C for 30 min and at 90 C for 30 minutes or 60 minutes all the films were in soluble in the original solvents or NMP. The fluxes of composite membranes made with these curing temperatures had higher water fluxes and slightly lower rejections as a function of decreasing temperature and or time of curing.

Example 2e

Example 2a is repeated in which a 200 nm thick film was formed with the difference that in this example 2e after the heat treatment at 110 C. for 60 minutes the membrane is placed back in the vacuum holder and the same polymer solvent solution is pulled through the membrane but in this second time the amount of polymer deposited is equivalent to a thin film thickness of 50 nm. The membrane is then placed in the oven at 110 C for 60 minutes for a second time. The membrane had a 90% rejection to sucrose. After exposure to 100 ppm hypochloride, Ph ~7, room temp' for 48 hours the rejection to sucrose was still 90%. When the membrane was placed in 1000 ppm NaCl, 50° C. for 24 hours the original rejection of 90% to sucrose remained at 90% rejection. The Lp for water was 3.6.

Example 3a

Composite NF membrane which is a combination of SPPS and SPPO is made with vacuum application instead of immersion or by pressure application. When longer curing times were used then an open RO formed, instead of a NF.

A) Method of formation is by application of the polymer solution (SPPS/SPPO) to the tight side of the UF membrane with vacuum on the down stream side. The resulting membrane is a composite of a thin selective barrier of SPPS/SPPO on a UF support.

B) The membrane formed is a NF membrane.

C) SPPS/SPPO/glycerol combination forms a crosslinked layer.

A 0.02% of total polymer of the combination described in example 2 SPPS/SPPO (80/20) both in lithium salt form in a ethanol/water (60/40) mixture with 20% glycerol was made up and 50 ml and adjusted to pH 1, was applied to the surface of the UF membrane (104 cm2 area) used in Example 1 but under vacuum of a piston vacuum pump. After the solution was passed though to make a calculated dry membrane thickness of 200 nm on the UF membrane the composite was then removed and placed in a oven at 110 C for 1 hour and gave an Lp of 4 and 88% rejection to sucrose, 75% to NaCl, 36% to CaCl2 and 96% to sodium sulfate. When a non-supported 10 micron thick film of the polymer solution was made and heat treated in the same way the resultant film did not dissolve in a strong solvent such as NMP.

If the membrane was cured for 90 minutes instead of 60 minutes then the rejections were 100% to sucrose, 93% to NaCl, 63% to CaCl2 and 98% to sodium sulfate. In this case an open RO membrane was made rather than a NF which was formed with the shorter curing times When the membrane was made in a pressure cell at 2-5 atm pressure by applying the pressure to the solution on the tight side of the UF membrane instead of a vacuum on the downstream the resulting NF membrane was approximately the same as when it was made by the vacuum method.

Membrane made with different times of curing gives different rejections as well as fluxes and that the time of curing can control these characteristics. In effect when the curing time was 30 minutes and 90 minutes the sucrose rejection was 92 and 99% and the Lp 6.2 and 3.0 respectively. If instead of changing times of curing at a given temperature if only the temperature of curing is changed as by way of a non-limiting example from 110 C to 95 C for 1 hour the rejection sucrose is 89% and the flux 5.8 Lp Thus by adjusting the curing temperature and times membranes with different fluxes and rejections can be achieved.

Different thickness of the selective thin layer could be made. Calculated thickness of 30 nm 50 nm 80, 100 and 300 nm were also prepared. In general the thinner membranes had higher fluxes and somewhat lower rejections, but the curing times and degree of crosslinking can be adjusted to give similar rejections. In this way too fluxes and rejections could be modified.

Example 3b

This is like 3a with the difference in the ratio of SPPS/SPPO to show that good membranes can be made with different ratios. The procedure of coating the UF support is vacuum coating.

Example 3a is repeated using SPPS/SPPO in a ratio of 90/10 instead of 80/20. The resulting membrane had 98% rejection to sucrose and a Lp of 2.7.

When a non-supported 10 micron thick film of the polymer solution was made and heat treated in the same way the resultant film did not redissolve in the original solution from which it was cast or in the stronger solvent NMP.

Example 3c

This example is to show that a composite membrane made by the vacuum method does not form a highly rejecting membrane when made only with SPPO In effect it does not form the same NF membrane with high sucrose rejection. In effect it forms an open NF instead of a tighter or more highly rejecting membrane as in 3a.

Example 3a is repeated with only SPPO Li salt as a 0.02% solution. The resulting membrane had 45% rejection to sucrose with a Lp 10.

Example 3d

The use of two different polymers in addition to the SPPS membranes. This composite NF whose selective layer is crosslinked or insolubilized by the combination of SPPO and polyhydroxystryrene (PHSTy) and formed by vacuum coating.

A) Method of formation is by vacuum coating.

B) The resulting membrane is a composite of a thin selective barrier of SPPS of SPPO and PHSTy) on a UF support.

C) The membrane formed is a NF membrane.

D) The SPPS/SPPO/PHSTY polymer combination is crosslinked, with SPPO introducing additional hydrophobicity by the loss of sulfonic groups during the curing processes. Thus example 1d is repeated but with the addition of sulfonated polyphenylene oxide PPO (2 meq.gr) and polyhydroxystryrene (PHSTy) (MW 20,000 Aldrich Catalog No. 43, 622-4) in a ratio of 80% SPPS and 15% PPO and 5% PHSTy. The resulting membrane showed flux of Lp 3.2 and a 94% rejection to sucrose. The resultant selective layer was in part crosslinked while that of example 1d was not. When a non-supported 10 micron thick film of the polymer solution was made and heat treated in the same way the resultant film did not dissolve in a strong solvent such as NMP.

Example 4a Composite NF whose selective layer is a combination of SPPS and Sulfonated polyetherether ketone (SPEEK) instead of SPPO made with vacuum application instead of immersion or by pressure application.

a) Method of formation is by application of the polymer solution (SPPS/SPEEK) to the tight side of the UF membrane with vacuum on the down stream side. The resulting membrane is a composite of a thin selective barrier of SPPS/SPPEK on a UF support, b) The membrane formed is a NF membrane c) SPPS is not crosslinked and the SPEEK is crosslinked.

A 0.02% of total polymer of the combination described in example 2 SPPS/SPEEK (80/20) both in H form in a ethanol/water (60/40) mixture with 20% glycerol was made up and 50 ml and adjusted to pH 1, was applied to the surface of the UF membrane (104 cm2 area) used in Example 1 but under vacuum of a piston vacuum pump. After the solution was passed though to make a calculated dry membrane thickness of 200 nm on the UF membrane the composite was then removed and placed in a oven at 110 C for 1 hour and gave an Lp of 5.2 and 98% rejection to sucrose, 78% to NaCl, 55% to CaCl2 and 98% to sodium sulfate. When a non-supported 10 micron thick film of the polymer solution was made and heat treated in the same way the resultant film did not redissolve in the original solution from which it was cast. The ion exchange capacity of the SPPS and SPPEK being 1.5 and 1.8 meg/gr respectively. The SPEEK being made according to the procedure described in U.S. Pat. No. 6,090,895)

Example 4b

Use SPEEK and SPPO to form the crosslinked structures of the selective layer which also includes SPPS. NF composite membrane whose selective layer is a combination of both SPPS and SPPO/SPEEK as the crosslinking component instead of SPPO or SPEEK alone made with vacuum application instead of immersion or by pressure application.

A 0.02% of total polymer of the combination described in example 2 SPPS/SPEEK/SPPO) (70/15/15) all in Li or H form in a ethanol/water (60/40) mixture with 20% glycerol was made up and 50 ml and adjusted to pH 1, was applied to the surface of the UF membrane (104 cm2 area) used in Example 1 but under vacuum of a piston vacuum pump. After the solution was passed though to make a calculated dry-membrane thickness of 200 nm on the UF membrane the composite was then removed and placed in a oven at 110 C for 1 hour and gave an Lp of 3.4 and 97% rejection to sucrose, 72% to NaCl, 59% to CaCl2 and 98% to sodium sulfate. When a non-supported 10 micron thick film of the polymer solution was made and heat treated in the same way the resultant film did not redissolve in the original solution from which it was cast. The ion exchange capacity of the SPPS and SPPPEK and SPPO being 1.5 and 1.8 meg/gr and 2.1 respectively.

Example 4c

Composite NF—Instead SPPS a different ionomer is used —SPES Polyethersulfone [PES] (Radel 100 from Solvay) was sulfonated according to the procedure of in U.S. Pat. No. 4,508,832 and gave an ion exchange capacity of 1.2 meq/gram.

In effect a selective NF which is a combination of SPES and SPPO the latter of which is the crosslinking component. Membrane made with vacuum application instead of immersion or by pressure application.
a) Method of formation is by application of the polymer solution (SPES/SPPO) to the tight side of the UF membrane with vacuum on the down stream side. The resulting membrane is a composite of a thin barrier of SPES and SPPO on a UF support,
b) The membrane formed is a NF membrane
c) The SPES/SPPO The SPPO is the polymer which is crosslinked.

A 0.02% of total polymer of the combination described in example 2 SPES/SPPO (80/20) both in lithium salt form in a ethanol/water (60/40) mixture with 20% glycerol was made up and 50 ml and adjusted to pH 1, was applied to the surface of the UF membrane (104 cm2 area) used in Example 1 but under vacuum of a piston vacuum pump. After the solution was passed though to make a calculated dry membrane thickness of 200 nm on the UF membrane the composite was then removed and placed in a oven at 110C for 1 hthe and gave an Lp of 5 and 87% rejection to sucrose, 60% to NaCl, 38% to CaC12 and 90% to sodium sulfate. When a non-supported 10micron thick film of the polymer solution was made and heat treated in the same way the resultant film did not redissolve in the original solution from which it was cast. The ion exchange capacity of the SPES and SPPO are 1.2 and 2.0 meq/gr respectively.

Example 4d

If Example 4c is repeated wherein sulfonated polysulfone is used with a capacity of 1.7 meq/gr instead of SPES the resultant membrane had a Lp of 3.0 and a sucrose rejection of 91%.

Example 5

In this example the selective layer of the NF composite comprises SPPS and a monomeric crosslinker tris hydroxylphenyl ethane instead of polyhydroxystyrene (as in example 2a) and a high molecular weight water soluble additive polystyrene sulfonic acid (SPSA). The SPSA is used is used to change the morphology and or density of the final film because of the high viscosity it generates as it is concentrated on the surface of the UF membrane. The low molecular weight THPE is the crosslinker. All other procedures in the fabrication are the same as in example 2. Thus example 2a is repeated. In effect a 0.02% of total polymer of the combination described in example 2a but instead of polyhydroxystryrene, tris(hydroxyphenyl)ethane (THPE) is used PHSTy, sulfonated polystyrene sulfonic acid (SPSA) (MW 200,000 (Aldrich catalog No. 56195-9). Thus the ratio used was SPPS/THPE/SPSA (90/5/5) in an ethanol/water (60/40) mixture with 20% glycerol was made up and 50 ml was applied to the surface of the UF membrane (104 cm2 area) as in example 8. After the solution was passed though to make a calculated dry membrane thickness of 200 nm on the UF membrane that was then removed and placed in an oven at 110 C for 60 min. and gave a 99% rejection to sucrose, Lp of 4.0. When a non-supported 10 micron thick film of the polymer solution was made and heat treated in the same way the resultant film did not dissolve in NMP a strong solvent.

Example 6a

This is an example of oxidative coupling of one of the components of the selective barrier and not by acid treatment as described above in the other examples. Selective NF membrane which is a combination of SPPS and polyhydroxystyrene (PHSTY) and made with vacuum application instead of immersion or by pressure application. In this example the PHSTY is crosslinked by oxidative coupling with potassium ferricyanide in the solution of SPPS/PHSTY applied to the surface of the UF support with the ethanol/water mixture set at a pH of 10. After depositing upon a UF support the film is heated as before to 110 C for 1 hr.
a) Method of formation is by application of the polymer solution (SPPS/PHSTY)) to the light side of the UF membrane with vacuum on the down stream side. The resulting membrane is a composite of a thin barrier of SPPS on a UF support,
b) The membrane formed is a NF membrane c) The selective barrier is crosslinked through PHSTY by oxidative coupling with potassium ferricyanide.

Thus Example 2a is repeated but with the coating solution containing 1 mM of potassium ferricyanide and the pH adjusted to 10 instead of 1. A 0.02% of total polymer of the combination described in example 4 but with SPPS/PHSTY (90/10) in a ethanol/water (60/40) mixture with 20% glycerol and 1 mM of potassium ferricyanide at a pH of 10 was made up and 50 ml was applied to the surface of the UF membrane (104 cm2 area) used in Example 1 but under vacuum of a piston vacuum pump. After the solution was passed though (~90 minutes) to make a calculated dry membrane thickness of 200 nm on the UF membrane that was then removed and placed in an oven at 110 C for 1.0 h the The membrane gave a 96% rejection to sucrose and Lp 5. When a non-supported 20 micron thick film of the polymer solution was made and heat treated in the same way as in the formation of the composite the film did not redissolve in NMP a strong solvent.

Comparative examples showing poor performance of membrane made without the oxidative catalyst K3Fe[CN]6. When the pH of the SPPS/PHStyOH/K3Fe[CN]6 solution was made in the way but at a pH of 6 the flux and rejection were approximately the same as when the membrane was made with a pH of 10. If the same membrane is made but without the inclusion of potassium ferricyanide the rejection of the resulting membrane was less than 50% to sucrose.

Example 6b originally example 10b. If example 6a is repeated but using 1,1,1 tris(hydroxyphenyl)ethane instead of PHSTY as the crosslinker at a pH 6 the resulting membrane had a rejection and flux of 92% to sucrose and 5 Lp to water. If the same membrane is made without the potassium ferricyanide then the rejection to sucrose is less than 30%.

Example 6c

In this example using Fenton reagent for oxidative coupling rather than potassium ferricyanide. Composite NF membranes by vacuum deposition made by oxidative coupling of the polyhydroxystyrene (PHSTy) component of the SPPO/PHSTY mixture using a Fenton reagent rather than potassium ferricyanide.

Thus Example 6a is repeated using but with the solution containing 200 ppm $FeSO_4/H_2O_2$ at pH 3. The membrane gave a rejection to sucrose 85% and an Lp 5. When a non-supported 10 micron thick film of the polymer solution was made and heat treated at 100 C/20 min the resultant film did redissolve in the original solution. After exposure to the Fenton solution a similar self standing film of 20 microns thickness without the UF support did not redissolved in the original solvent or in NMP a strong solvent. indicating a crosslinked film.

Example 7

In this example the use polyvinylalcohol (PVA) in addition to SPPO. PVA is both a crosslinker and hydrophilic. It is used in this example to make a NF composite by the vacuum deposition method on a UF support.

Thus this example is for a selective NF which is a combination of SPPS/SPPO/PVA and made with vacuum application instead of immersion or by pressure application.

A) Method of formation is by application of the polymer solution (SPPS/SPPOPVA) to the tight side of the UF membrane with vacuum on the down stream side. The resulting membrane is a composite of a thin selective barrier of SPPS/SPPO/PVA on a OF support, B) The membrane formed is a NF membrane.

When example 3a is repeated but including poly(vinyl alcohol) (99+% hydrolyzed MW 86K Aldrich catalog No. 36, 314-6). Thus using SPPS/SPPO/PVA (70/20/10) instead of SPPS/SPPO (80/20) The final membrane gave an Lp of 5 and 94% rejection to sucrose,. When a non-supported 10 micron thick film of the polymer solution was made and heat treated in the same way the resultant film did not redissolve in the original solution from which it was cast.

When only SPPO and PVA are used the rejection to sucrose was 80% and the Lp 6. When only PVA is used the rejection to sucrose is 10% and the Lp 50. These results show the importance of having a combination of different components to achieve high rejecting NF membranes.

Example 8

Composite NF membrane made by pressure application. The NF membrane is an open membrane relatively low salt rejection. The selective layer is made of a combination of the perfluorinated ionomer Nafion and a hydrophilic crosslinker polyvinylalcohol (PVA).

A 0.1% Nafion/PVA solution also containing 25% Nafion and 75% PVA wherein the polyvinyl alcohol was 99% hydrolyzed and molecular weight of about 86,000, was prepared in ethanol/water at pH 1 (60:40) mixture and was applied at 3 bar pressure to the surface of the UF membrane (of 10 cm2 area) as made in Example 1c, and sufficient solution collected in the permeate to make a 1 micron thick coating The resulting membrane was then heat cured at 90 C for 300 minutes to crosslink the PVA. When checked at 10 bars in a pressure cell the membrane had an Lp of 9 L/m2 hr-bar to pure water. Testing with 1000 ppm NaCl the rejection was 53%, and 60% to sucrose.

Example 9

The formation of a solvent stable NF composite by coating the selective bather by immersion of a solvent stable UF support into a solution of the polymers forming the selective barrier.

A) Method of formation is by immersion coating. The coating is placed on both sides but only the coating on the small pore side of the solvent stable UF asymmetric support remains intact when placed face up in the pressure cell, and the bottom coating gets washed away.

B) The resulting membrane is a composite of a thin selective barrier of SPPS/SPPO on a solvent stable UF support.

C) The membrane formed is a solvent stable NF membrane.

D) SPPS is not crosslinked and the SPPO is crosslinked.

E) The SPPS/SPPO/polymer is crosslinked.

A solvent stable crosslinked polyacrylonitrile membrane made according to U.S. Pat. Nos. 5,032,282 (Linder et al) instead of GE Osmonic's P-series PES ultrafiltration membrane according to the procedure of Example 2 In effect a solution of sulfonated 2,6dimethyl polyphenylene oxide (SPPO) (2 meq.gr) Li salt in a ratio of 80% SPPS and 20% PPO is coated unto the surface of the solvent stable UF support with the difference that after the application of the thin film to the surface of the UF support the film was heated at 90 C for 30 minutes. The final membrane had a 90% rejection to sucrose. This NF membrane was found stable in solvents such as alcohols, ethers aromatics, hydrocarbons and aqueous solutions of aprotic solvents such as DMF NMP and others and could be used as a solvent stable NF membrane. The NF membrane had 95% rejection to congo red.

A ceramic UF membrane from CeraMem Ltd with a nominal pore size of 5 nm with similarly modified to achieve a solvent stable, chemically stable NF membrane. The NF membrane had 95% rejection to congo red.

Example 10

In this example the selective film of the NF composite is an intimate mixture of both anionic (such as, sulfonic) groups and cationic (such as, quaternary ammonium) groups to form an amphoteric structure. The structures such as these can give relatively low rejections give low rejections to salts and high rejections to non-charged organic solutes such as sucrose.

The membrane is made by vacuum deposition and contains SPPO as the component that crosslinks An amphoteric membrane was made by first carrying out (according to the procedure in U.S. Pat. No. 5,028,337) brominatiom of 2,6 dimethylpolyphenylene oxide to form a bromomethylated derivative and then quaternizing this polymer with triethylamine to form a quaternized polymer with 1,3 meq/gr ammonium groups. A solution containing 0.01% of this quaternized 2,6 dimethylpolyphenylene oxide (PPON+) and 0.01% solution of SPPS (1.5 meq/gram) and 0.005% SPPO were prepared in (ethanol/water 80/20) under high dilution so as not to form a precipitating complex. Example 3a was repeated but with substituting this solution for the solution in example 4. The resulting membrane had a 92% rejection to sucrose but the rejection to NaCl (10 mM) and calcium chloride (4 nM) the rejections to both sodium and calcium ions were both about 60 to 63%.

Example 11

In this example the selective film contains two separated layers. The first layer deposited on the UF support by vacuum deposition has a net cationic charge (such as, quaternary ammonium) of quaternized 2,6 dimethylpolyphenylene oxide (PPON+) with polyvinyl alcohol which crosslinks upon curing under acidic conditions. The second top layer is anionic (such as, sulfonic) groups from SPPS with SPPO as the crosslinking component. The structures such as these give high rejection to salts and non charged organics such as sucrose.

Thus a bilayer membrane was made by first coating a solution containing 0.01% of quaternized 2,6 dimethylpolyphenylene (PPON+) (1,3 meq/gr ammonium groups) (the same polymer as in example 14a and 0.005% PVA in (ethanol/water 80/20) by vacuum deposition to form a 100 nm thick film followed by heating at 110 C for 60 minutes as in example 4. Upon this solution a coating of SPPS/SPPO (80%/20%) by pressure technique as described in Example 3a to add a second 100 nm thick film and cured at 100C./60 minutes. The resulting membrane had a 99% rejection to sucrose and 92% rejection to 1000 ppm NaCl with an Lp of 2.3.

Example 12

Adding a crosslinked hydrophilic coating to the NF membrane for reduced fouling and improved selectivity. By vacuum deposition.

Example 2a is repeated—In effect SPPS/SPPO (80/20) both in lithium salt form in a ethanol/water (60/40) mixture with 20% glycerol was made up and 50 ml and adjusted to pH 1, was applied to the surface of the UF membrane (104 cm2 area) used in Example 1 but under vacuum of a piston vacuum pump. After removing all of the liquid water a 2nd layer of polyvinyl alcohol (poly(vinyl alcohol 99+% hydrolyzed MW 86 36,314-6,000-146,000 Aldrich catalog No. 36, 314-6). by adding to the surface of the membrane just formed 0.01% solution of PVA to form a 50 nm thick film removing and curing at 100 C for 60 minutes to crosslink the PVA. The resulting membrane had 89% rejection to sucrose and 67% rejection to 1000 ppm NaCl with an Lp of 4.2

The PVA coating could be applied by immersion or other coating methods to achieve the same results by adjusting the concentration of the PVA solution applied.

Example 13

Open NF by immersion coating using sulfonated PES. And Nafion with SPPO as the crosslinker applied to the UF support by immersion method of example 1.

Polyethersulfone [PES] (Radel 100 from Solvay) was sulfonated according to the procedure of in U.S. Pat. No. 4,508, 832 and gave an ion exchange capacity of 1.2 meq/gram. When a mixture of Nafion and the sulfonated PES and SPPO was used together in a 1/1/1 ratio and a total concentration of 2% and applied and cured as in example 1 above the membrane after conditioning [and conditioning by placement in 1% saline for 2 hours, washed, immersed in 0.5% sodium hypochlorite, washed then $H_2SO_4$ 1M for 2 hours] was checked at 10 bars in a pressure cell the membrane had a Lp of 12 L/m2 hr-bar to pure water. Testing with 5% glucose showed a rejection of 80% and to 1000 ppm NaCl the rejection was 65% and the Lp 11 L/m2 hr-bar.

Example 14

Donnen Dialysis

The membrane of example 1 used in a Donnan dialysis mode to exchange iron III for protons to form hydrochloric acid in place of iron chloride.

Unsupported cation exchange membranes prepared as in example 2a /were mounted in a small ED stack without anion exchange membranes. A solution Iof 500 ppm NaCl and 300 ppm of CaCl2 and a solution II of 3% NaCl were circulated through alternate compartments. 80% of the Ca was transferred from solution I to solution II by ion exchange (Donnan dialysis)

Example 15

Fuel Cell (FC) Membrane

UF membrane made from polyether sulfone is prepared by dissolving 15 grams of polyether sulfone 5003 from Imperial Chemical Industries (ICI). and 5 grams of sulfonated polyetheretherketone)2.2 meq/gr) by dissolving both in a solvent combination composed of 60 grams N-Methylpyrrolidinone and 20 grams of formamide. After stirring for 4 hours at 60 C the solution is left to stand for overnight and then coated onto a polyolefin Awa non-woven Fabric, a 200 micron wet film, immersing immediately in ice water and after 1 hr removing and leaching the remaining solvent in running water for overnight at ambient conditions.

After leaching for overnight in water at ambient conditions the UF support is coated with a mixture as of Nafion and the sulfonated SPPS and SPPO was used together in a 1/1/1 ratio and a total concentration of 2% in a solution which contained ethanol/water/glycerol (67/13/20) and applied and cured as in example 2a. The Composite was placed in 1% saline for 2 hours, washed, immersed in 0.5% sodium hypochlorite, washed then $H_2SO_4$ 1M for 2 hours and then washed and placed in a measuring cell to measure proton conductivity. The proton conductivity was found to be 0.05 S/cm as compared to a commercial Nafion with a proton conductivity of 0.15 S/cm. The use of SPEEK in the UF casting solution is to give proton conductivity throughout the thickness of the UF support as well as through the selective thin film.

Example 16

A membrane (other than a composite membrane) made by casting and evaporating a solution of Nafion/SPPS/SPPO and then curing the film.

The selective thin film of Nafion/SPPS/SPPO is made as a self standing film in this application and tested for proton conductivity as a fuel cell membrane. A mixture as of Nafion, sulfonated SPPS and SPPO dissolved together in a ethanol/water mixture of 60/40 in a 1/1/1 ratio with 20% glycerol with a total concentration of 10% and applied and applied to a glass plate at a wet film thickness of 400 microns. The wet film was slowly evaporated at 60 C for overnight and then cured at 110 C for 4 hours.

The membrane was placed in 1% saline for 2 hours, washed, immersed in 0.5% sodium hypochlorite, washed then $H_2SO_4$ 1M for 2 hours and then washed and placed in a measuring cell to measure proton conductivity. The proton conductivity was found to be 0.08 S/cm as compared to a commercial Nafion with a proton conductivity of 0.15 S/cm.

The ion exchange capacity of the Nafion, SPPS and SPPO are 0.9 meg/gr, 1.6 meq/gr and 1.9 meg/gr respectively.

Example 17

The use of hydroxylated polysulfone in forming NF composites by the vacuum deposition method on UF supports.

The comparison is with example 2 where the hydroxyl containing polymer was polyhydroxystryrene (PHSTY) which is not as chemically stable as hydroxylated engineering plastics such as polysulfone, polyethersulfone, PEEK or PES for example.

Polysulfone (PSU) was nitrated and reduced to the amino derivative by the procedure described in Modification of Condensation Polymers pp 16-17 by W. E. Daly, S. Lee and C. Rungaroonthailcul in Chemical reactions on Polymers, ACS symposium series 364 1986, to give a PSU polymer derivative with 1.8 meg/gr —$NH_2$ groups. The aminated polymer was then added to a mixture of sulfuric and sodium nitrate at 4 C to form the diazonium groups from the —$NH_2$ groups. After 60 minutes of reaction hot sulfuric acid was added to form —OH groups The hydroxylated polysulfone was then used as in examples 2a and 2b and 6a instead of the PHSTY) to give membranes with rejections to sucrose of 95+% and fluxes between 2 to 8 Lp. These membranes had superior oxidant stability than the membranes made from PStyOH.

Example 18a

Sulfonated polyphenylsulfone (SPPS) with 1.6 meq/gr sulfonic groups was made as example 1. Aminated polyphenylsulfone was made using the procedure in example 17 A solution of 80% SPPS and 20% PPS—$NH_2$ are dissolved in the solvent mixture as in example 1 to give a total polymer concentration of 0.53% and applied to the surface of a UF support by vacuum filtration forming layer of 200 nm dry thickness. The UF membrane was placed in a oven at 90 C for 1 hour. The composite was then exposed to a solution containing 3% of sodium nitrite and sulfuric acid to pH 1 for 2 hours at 0 to 50 C. It was then placed in pH 8 at room temperature for 1 hr.

The membrane gave 85% rejection to sucrose, 100% rejection to congo red, and 68% rejection to sodium chloride, and Lp 6.

When a non-supported 20 micron thick film of the polymer solution was made and heat treated in the same way as in the formation of the composite the film did not redissolve in the original solution or in NMP a strong solvent. It was found that the coating was chemically bound to the support.

When the above example 18a was repeated with heating after the coating step at 110 C instead of 80 C the membrane had similar performance with 10 to 20% lower flux. Similarly if the membrane of example 18a is repeated but with a heating step after the pH 8 immersion step at 60 C for 30 minutes instead of leaving it at room temperature the resulting flux is lowered to an Lp of 4 and the sucrose rejection is 90%. It should be clear that this as well as all the examples are open for optimization of the different variables and parameters such as concentration, times, pH's, choice of solvents, choice of UF supports, curing temperatures and others, well known in the state of art.

Example 18b

Example 18a is repeated with the difference that after the treatment with sodium nitrite/$H_2SO_4$ the membrane is removed from the solution and without changing the pH of the coating is heated for 1 hour at 80 C. The resulting membrane had similar performance as the membrane in Example 18 a but with higher flux. When a non-supported 20 micron thick film of the polymer solution was made and heat treated in the same way as in the formation of the composite the film did not dissolve in the original solution.

Example 19a

In this example the amino derivatives of the polyphenylsulfone in Example 18 is converted to the diazonium salt with nitrous acid in an aqueous solution under acidic conditions at 0 to 4 C. This solution with all the other components is then made basic and applied to the surface of the membrane and then cured at elevated temperature.

Thus Example 2a is repeated using the aminated polyphenylsulfone derivative of example 18 instead of PHSTy. The solution used for coating the UF support of example 1 is a solution containing 0.02% of total polymer with SPPS/PPS—$NH_2$ (90/10) in a ethanol/water (60/40) mixture with 20% glycerol. To this 1mM of nitrous acid is formed in the solution by adding sodium nitrite and sulfuric acid at a pH of 1 at 0 to 4 C and stirred for 30 minutes. 50 ml of this solution is brought to pH 10 with ammonium hydroxide and applied to the surface of the UF membrane (104 cm2 area) used in Example 1 but under vacuum of a piston vacuum pump. After the solution was passed though (~90 minutes) to make a calculated dry membrane thickness of 200 nm on the UF membrane that was then removed and placed in a oven at 80 C for 1.0 hour. The membrane gave a 80. % rejection to sucrose, 95% rejection to congo red, and 75% rejection to sodium chloride and Lp 7. When a non-supported 20 micron thick film of the polymer solution was made and heat treated in the same way as in the formation of the composite the film did not dissolve in NMP.

Example 19 b

Example 19a was repeated but without changing the pH of the solution to pH 10. In effect it was left at pH 1.0. This example shows crosslinking due to aryl diazonium salts decomposing to cations which add to other aromatics as the crosslinking mechanisms.

Example 20

When example 18 is repeated using aminated polysulfone (1.86 meq $NH_2$/gr) synthesized according to the procedure described in Example 17, instead of polyphenylsulfone the results were similar with respect to flux with about 20% lower rejections in sucrose.

Example 21

Example 18a is repeated using aminated polyphenylene oxide of 3.2 meq amino/gr. The results show a membrane of 76. % rejection to sucrose, 90% rejection to Congo red, and 50% rejection to sodium chloride and Lp 11. When a non-supported 20 micron thick film of the polymer solution was made and heat treated in the same way as in the formation of the composite the film did not redissolve in NMP a strong solvent. When the self standing film was made without glycerol it also did not dissolve.

What we claim is:

1. A membrane comprising an ionomer crosslinked through aryl-aryl (—Ar—Ar—), aryl-ether-aryl (—Ar—O—Ar—), aryl-sulfide-aryl (—Ar—S—Ar—) bonds or a combination thereof, wherein said ionomer comprises at least one ionic group selected from the group consisting of sulfonic, carboxylic, phosphoric, quaternary ammonium group and any combinations thereof.

2. The membrane of claim 1, wherein said membrane is a composite membrane.

3. The membrane of claim 1, wherein said membrane is selected from the group consisting of composite nanofiltration (NF), reverse osmosis (RO) and ultrafiltration (UF) membrane.

4. The membrane of claim 1, wherein said membrane is a gas separation or an ion exchange membrane.

5. The membrane of claim 4, wherein said ion exchange membrane is adapted for use in electro dialysis (ED), Donnan dialysis (DD) or fuel cells.

6. The membrane of claim 1, wherein said ionomer is a film and/or coating crosslinked to a support layer through covalent bonds.

7. The membrane of claim 6, wherein said support layer comprises ultrafiltration (UF) membrane or microfiltration (MF) membrane.

8. The membrane of claim 6, wherein said ionomer is crosslinked to the support layer through aryl-aryl, aryl-ether-aryl, aryl-sulfide-aryl bonds or a combination thereof.

9. The membrane of claim 1, wherein said ionomer comprises aromatic condensation polymer.

10. The membrane of claim 9, wherein said aromatic condensation polymer is selected from the group consisting of polysulfone (PSU), polyphenylsulfone $(PPS)_5$ polyphenylene sulfone, polyethersulfone (PES), polyetherketone, polyether ketone ether ketone, a combination of poly ether ketone and polysulfone, polyphenylene sulfide, phenylene sulfone, a combination of sulfide and sulfone, poly ether based on polyphenylene oxide, 2,6dimethyl phenylene, any derivatives thereof, and any combination thereof.

11. The membrane of claim 1, further comprising an additional polymer, said additional polymer comprises a sulfonated polymer and/or a fluorinated polymer, a fluorinated polymer or a combination thereof.

12. The membrane of claim 11, wherein said fluorinated polymer is selected from the group consisting of: polyvinylidene fluroride (PVDF), polyteterafluroethylene (PTFE), poly hexafluropropylene (PHFP), polychlorotrifluoroethylene (PCTF) and copolymers, tripolymers, or combinations thereof.

13. The membrane of claim 12, wherein said copolymers tripolymers, or combinations thereof are selected from the group consisting of: PVDF- co-PTFE, PVDF-co-PTFE, PVDF-co-PHFP, PVDF-co-PCTF Poly(perfluoro dioxoles) as a homopolymer, copolymers with a fluorinated monomer, partially fluorinated polymers alpha substituted, non-substituted tri-fluorinated polystyrenes and any combination thereof.

14. The membrane of claim 1, wherein said ionomer further comprises hydrophobic groups.

15. A process for the preparation of a membrane comprising: forming a thin layer comprising an aromatic ionomer on a surface of a UF or a MF membrane by coating of an aqueous solution comprising the aromatic ionomer onto the selective surface of the UF or MF membrane; and crosslinking the aromatic ionomer to form aryl-aryl (—Ar—Ar—), aryl-ether-aryl (—Ar—O—Ar—) and/or aryl-sulfide-aryl (—Ar—S—Ar—) bonds or a combinations thereof.

16. The process of claim 15, further comprising evaporating the coating solution prior to crosslinking.

17. The process of claim 15, wherein the aryl-sulfide-aryl bonds are further oxidized to produce aryl-sulfone-aryl (—Ar—$SO_2$—Ar—) bonds.

18. The process of claim 15, wherein the crosslinking comprises coupling an aryl diazonium salt of a compound selected from the group consisting of a multifunctional monomer, a multifunctional oligomer and a multifunctional polymer to an aryl group of the aromatic ionomer, thereby obtaining an aryl-aryl bond.

19. The process of claim 15, wherein the crosslinking comprises coupling a hydroxy (—OH) aryl of a compound selected from the group consisting of a multifunctional monomer, a multifunctional oligomer and a multifunctional polymer to an aryl group of the aromatic ionomer, thereby obtaining aryl-ether-aryl bonds.

20. The membrane of claim 1, further comprising polyelectrolyte crosslinked through aryl-aryl (—Ar—Ar—), aryl-ether-aryl (—Ar—O—Ar—) and/or aryl-sulfide-aryl (—Ar—S—Ar—) bonds or a combinations thereof.

21. The membrane of claim 1, wherein said ionomer and said polyelectrolyte are crosslinked through aryl-aryl (—Ar—Ar—), aryl-ether-aryl (—Ar—O—Ar—) and/or aryl-sulfide-aryl (—Ar—S—Ar—) bonds or a combinations thereof.

22. The process of claim 15, wherein the thin layer further comprises a polyelectrolyte, wherein the aqueous solution further comprises a polyelectrolyte and wherein crosslinking further comprises crosslinking the polyelectrolyte to form aryl-aryl (—Ar—Ar—), aryl-ether-aryl (—Ar—O—Ar—) aryl-sulfide-aryl (—Ar—S—Ar—) bonds or a combinations thereof.

* * * * *